US008499211B1

(12) United States Patent
Maxemchuk et al.

(10) Patent No.: US 8,499,211 B1
(45) **Date of Patent: *Jul. 30, 2013**

(54) NETWORK-BASED SERVICE FOR THE REPAIR OF IP MULTICAST SESSIONS

(75) Inventors: Nicholas Frank Maxemchuk, Mountainside, NJ (US); David McManamon, Dayton, OH (US); David Hilton Shur, Aberdeen, NJ (US); Aleksandr Zelezniak, Matawan, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 959 days.

This patent is subject to a terminal disclaimer.

(21) Appl. No.: 12/578,915

(22) Filed: Oct. 14, 2009

Related U.S. Application Data

(63) Continuation of application No. 12/359,496, filed on Jan. 26, 2009, now Pat. No. 7,620,847, which is a continuation of application No. 10/874,591, filed on Jun. 23, 2004, now Pat. No. 7,590,889, which is a continuation of application No. 10/330,837, filed on Dec. 27, 2002, now Pat. No. 6,782,490, which is a continuation of application No. 09/271,116, filed on Mar. 17, 1999, now abandoned.

(51) Int. Cl.
*G08C 25/02* (2006.01)
*H04L 1/18* (2006.01)

(52) U.S. Cl.
USPC ............. 714/748; 714/18; 714/776; 370/401; 370/410; 370/431; 370/432

(58) Field of Classification Search
USPC .................... 370/401, 410, 432, 431; 714/18, 714/748, 776
See application file for complete search history.

(56) References Cited

U.S. PATENT DOCUMENTS 6,501,763 B1 * 12/2002 Bhagavath et al. ........... 370/432
6,567,929 B1 * 5/2003 Bhagavath et al. ............. 714/18

* cited by examiner

*Primary Examiner* — Joshua P Lottich
*Assistant Examiner* — Jeison C Arcos
(74) *Attorney, Agent, or Firm* — Akerman Senterfitt; Michael K. Dixon; Roy Zachariah

(57) ABSTRACT

A system and method are disclosed for the repair of IP multicast sessions. A repair server polls multiple transmit servers to accumulate as many of the packets missing from the multicast session as possible. A network includes a source of multicast packets in a multicast session and a plurality of multicast recipients in that session. A repair server in the network provides the packets it receives to the recipients. The repair server includes a missing packet detector. There is a plurality of retransmit servers in the network buffering portions of the packets they respectively receive during the session. The repair server maintains an ordered list of the retransmit servers that are most likely to have buffered copies of packets missing from the session. When the repair server detects that there are packets missing from the session it has received, it uses the ordered list to sequentially request the missing packets from respective ones of the plurality of retransmit servers.

20 Claims, 37 Drawing Sheets

*FIG. 2D*

RTCP SOURCE DESCRIPTION PACKET PERIODICALLY OUTPUT BY MULTICAST GROUP_1 SOURCE 102

103'

| PACKET | | | | | | | | | | |
|---|---|---|---|---|---|---|---|---|---|---|
| IP HEADER | | | | UDP HEADER | | RTCP SOURCE DESCRIPTION | | | | |
| ... | SOURCE IP ADDRESS | DESTINATION IP ADDRESS | IP OPTIONS | SOURCE PORT | DESTINATION PORT | ... | CNAME | TOOL | NOTE |
| | RETRANSMIT SERVER 110A | MULTICAST GROUP_1 ADDRESS | | MESSAGE PROCESSOR 132A | MESSAGE PROCESSOR 142 | | GROUP_1 SOURCE 102 | MPEG2 | "VOICE TRACK IS 5 CHANNELS" |

*FIG. 2E*

RTCP SENDER REPORT PACKET PERIODICALLY OUTPUT BY MULTICAST GROUP_1 SOURCE 102

103"

| PACKET | | | | | | | | | |
|---|---|---|---|---|---|---|---|---|---|
| IP HEADER | | | | UDP HEADER | | RTCP SENDER REPORT | | | |
| . . . | SOURCE IP ADDRESS<br>RETRANSMIT SERVER 110A | DESTINATION IP ADDRESS<br>MULTICAST GROUP_1 ADDRESS | IP OPTIONS | SOURCE PORT<br>MESSAGE PROCESSOR 132A | DESTINATION PORT<br>MESSAGE PROCESSOR 142 | . . . | SENDER'S ID<br>GROUP_1 SOURCE 102 | SENDER'S PACKET COUNT<br>290 | SENDER'S OCTET COUNT<br>290,000 |

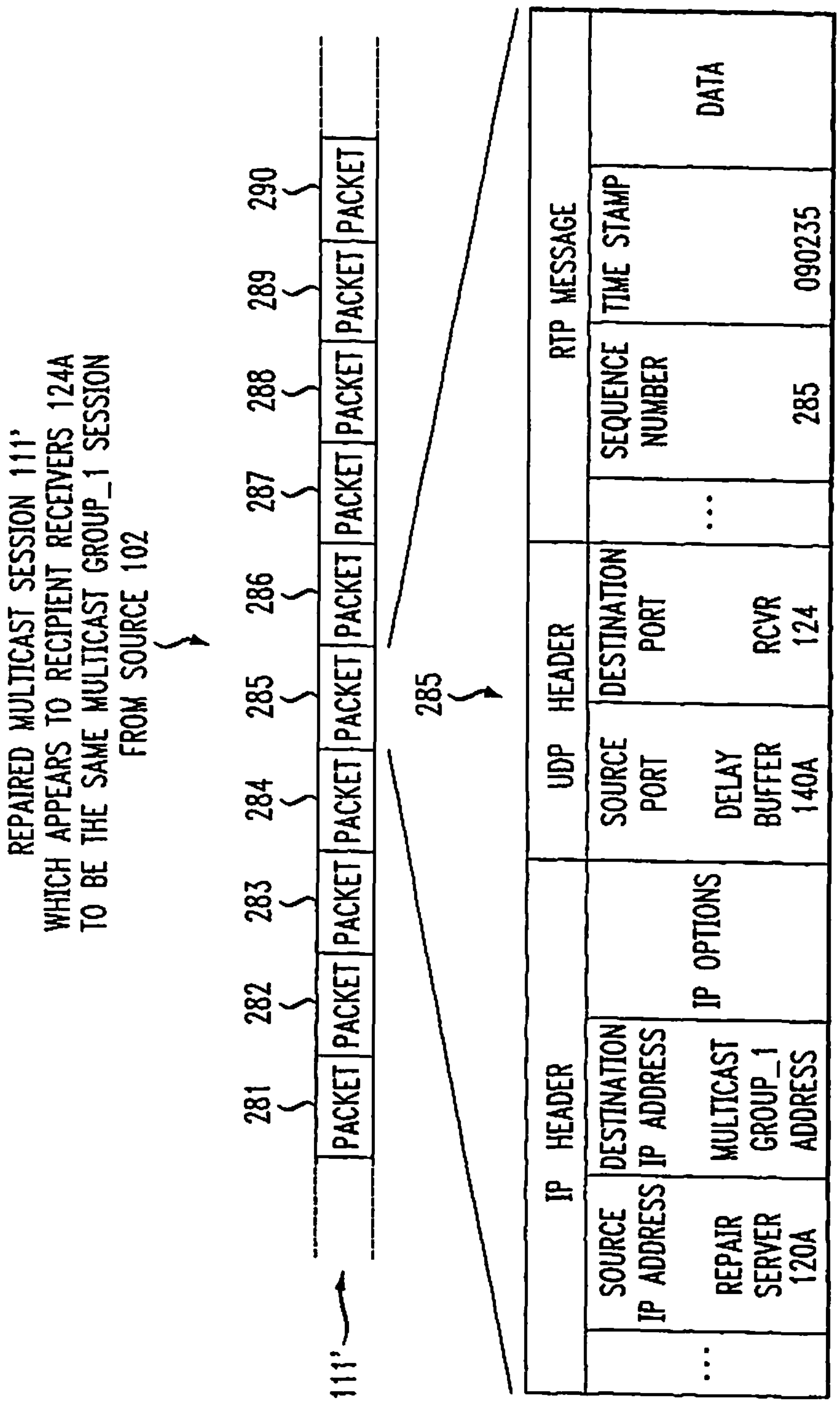

FIG. 2F

REPAIRED MULTICAST SESSION 111'
WHICH APPEARS TO RECIPIENT RECEIVERS 124A
TO BE THE SAME MULTICAST GROUP_1 SESSION
FROM SOURCE 102

111' → | PACKET 281 | PACKET 282 | PACKET 283 | PACKET 284 | PACKET 285 | PACKET 286 | PACKET 287 | PACKET 288 | PACKET 289 | PACKET 290 |

285 →

| IP HEADER | | | UDP HEADER | | RTP MESSAGE | | |
|---|---|---|---|---|---|---|---|
| SOURCE IP ADDRESS | DESTINATION IP ADDRESS | IP OPTIONS | SOURCE PORT | DESTINATION PORT | ... | SEQUENCE NUMBER | TIME STAMP | DATA |
| REPAIR SERVER 120A | MULTICAST GROUP_1 ADDRESS | | DELAY BUFFER 140A | RCVR 124 | | 285 | 090235 | |

REPAIRED MULTICAST SESSION 111'
WHICH HAS A DIFFERENT MULTICAST ADDRESS THAN THAT
OF THE ORIGINAL GROUP_1 SESSION FROM SOURCE 102

*FIG. 3E*

RTCP RECEIVER REPORT PACKET PERIODICALLY OUTPUT BY RETRANSMIT SERVER 110A

360A

| PACKET | | | | | | | | | | | | | |
|---|---|---|---|---|---|---|---|---|---|---|---|---|---|
| | IP HEADER | | UDP HEADER | | RTCP RECEIVER REPORT | | | | | | | | |
| ... | SOURCE IP ADDRESS | DESTINATION IP ADDRESS | SOURCE PORT | DESTINATION PORT | ... | ORIGINAL SENDER ID | RCVR'S ID | RCVR'S PACKET COUNT | FRACTION LOST | TOTAL LOST | INTERARRIVAL JITTER | ROUND TRIP DELAY |
| | RETRANSMIT SERVER 110A | MULTICAST GROUP_1 ADDRESS | MESSAGE PROCESSOR 132A | MESSAGE PROCESSOR 142 | | GROUP_1 SOURCE 102 | RETRANSMIT SERVER 110A | 286 | 286/290 | 4 | 0123 | 0567 |

*FIG. 3F*

RTCP RECEIVER REPORT PACKET PERIODICALLY OUTPUT BY RETRANSMIT SERVER 110B

360B

| PACKET | | | | | | | | | | | | |
|---|---|---|---|---|---|---|---|---|---|---|---|---|
| IP HEADER | | | UDP HEADER | | RTCP RECEIVER REPORT | | | | | | | |
| | SOURCE IP ADDRESS | DESTINATION IP ADDRESS | SOURCE PORT | DESTINATION PORT | | ORIGINAL SENDER ID | RCVR'S ID | RCVR'S PACKET COUNT | FRACTION LOST | TOTAL LOST | INTERARRIVAL JITTER | ROUND TRIP DELAY |
| ... | RETRANSMIT SERVER 110B | MULTICAST GROUP_1 ADDRESS | MESSAGE PROCESSOR 132B | MESSAGE PROCESSOR 142 | ... | GROUP_1 SOURCE 102 | RETRANSMIT SERVER 110B | 285 | 285/290 | 5 | 0125 | 0569 |

*FIG. 3G*

RTCP RECEIVER REPORT PACKET PERIODICALLY OUTPUT BY RETRANSMIT SERVER 110C

360C

| PACKET | | | | | | | | | | | | | |
|---|---|---|---|---|---|---|---|---|---|---|---|---|---|
| IP HEADER | | | UDP HEADER | | RTCP RECEIVER REPORT | | | | | | | | |
| ... | SOURCE IP ADDRESS | DESTINATION IP ADDRESS | SOURCE PORT | DESTINATION PORT | ... | ORIGINAL SENDER ID | RCVR'S ID | RCVR'S PACKET COUNT | FRACTION LOST | TOTAL LOST | INTERARRIVAL JITTER | ROUND TRIP DELAY |
| | RETRANSMIT SERVER 110C | MULTICAST GROUP_1 ADDRESS | MESSAGE PROCESSOR 132C | MESSAGE PROCESSOR 142 | | GROUP_1 SOURCE 102 | RETRANSMIT SERVER 110C | 284 | 284/290 | 6 | 0127 | 0571 |

*FIG. 3H*

RTCP RECEIVER REPORT PACKET PERIODICALLY OUTPUT BY RETRANSMIT SERVER 110D

360D

| PACKET | | | | | | | | | | | | |
|---|---|---|---|---|---|---|---|---|---|---|---|---|
| IP HEADER | | | UDP HEADER | | RTCP RECEIVER REPORT | | | | | | | |
| ... | SOURCE IP ADDRESS | DESTINATION IP ADDRESS | SOURCE PORT | DESTINATION PORT | ... | ORIGINAL SENDER ID | RCVR'S ID | RCVR'S PACKET COUNT | FRACTION LOST | TOTAL LOST | INTERARRIVAL JITTER | ROUND TRIP DELAY |
| | RETRANSMIT SERVER 110D | MULTICAST GROUP_1 ADDRESS | MESSAGE PROCESSOR 132D | MESSAGE PROCESSOR 142 | | GROUP_1 SOURCE 102 | RETRANSMIT SERVER 110D | 283 | 283/290 | 7 | 0129 | 0573 |

UNICAST REQUEST 150C
TO FIRST RETRANSMIT SERVER 110C FOR MISSING PACKETS

UNICAST REQUEST 150D
TO FIRST RETRANSMIT SERVER 110D FOR MISSING PACKETS

| PACKET | | | | |
|---|---|---|---|---|
| IP HEADER | | IP OPTIONS | UDP SEGMENT | REQUEST SEGMENT |
| SOURCE IP ADDRESS | DESTINATION IP ADDRESS | RETRANSMIT SERVER 110D | SOURCE PORT | DESTINATION PORT | DATA |
| REPAIR SERVER 120A | | | MESSAGE PROCESSOR 142A | CIRCULAR BUFFER 130D | MISSING SEQUENCE NUMBERS 288 |

UNICAST RESPONSE 160A
OF FIRST PORTION OF MISSING PACKETS ON HAND
AT RETRANSMIT SERVER 110A

UNICAST RESPONSE 160B
OF FIRST PORTION OF MISSING PACKETS ON HAND
AT RETRANSMIT SERVER 110B

UNICAST RESPONSE 160C
OF THIRD PORTION OF MISSING PACKETS ON HAND
AT RETRANSMIT SERVER 110C

UNICAST RESPONSE 160D
OF FOURTH PORTION OF MISSING PACKETS ON HAND
AT RETRANSMIT SERVER 110D

700

800

900

900A

900B

900C

NETWORK-BASED SERVICE FOR THE REPAIR OF IP MULTICAST SESSIONS

CROSS-REFERENCES TO RELATED APPLICATIONS

This application is a continuation of, claims priority to, and incorporates by reference herein in its entirety pending U.S. patent application Ser. No. 12/359,496, filed 26 Jan. 2009, which is a continuation of Ser. No. 10/874,591, filed 23 Jun. 2004, now U.S. Pat. No. 7,590,889, which is a continuation of U.S. patent application Ser. No. 10/330,837, filed 27 Dec. 2002, now U.S. Pat. No. 6,782,490, which is a continuation of U.S. patent application Ser. No. 09/271,116, filed 17 Mar. 1999.

BACKGROUND OF THE INVENTION

IP multicasting provides an efficient way for a source to send a stream of User Datagram Protocol (UDP) packets to a set of recipients. The source sends only one copy of each packet to an IP network, such as the Internet, for example. The routers in the IP network do the work required to deliver that packet to each recipient. Various IP multicast routing protocols can be used in an IP network. These allow the routers to communicate with each other so that the multicast datagrams are sent only to those subnetworks with receivers that have joined a multicast session.

A multicast session is identified by an IP address and port number. The IP address is a Class D address in the range from 224.0.0.0 to 239.255.255.255. IP multicasting is more efficient than unicasting for group communication. Unicasting requires that the source send a separate copy of each datagram to each recipient. This requires extra resources at the source and in the IP network and is wasteful of network bandwidth.

Some useful background references describing IP multicasting in greater detail include: (1) Kosiur, D., "IP Multicasting: The Complete Guide to Corporate Networks", Wiley, 1998; (2) Maufer, T., "Deploying IP Multicast in the Enterprise", Prentice-Hall, 1997; (3) Deering, S., "Host Extensions for IP Multicasting," Network Working Group Request for Comments Internet RFC-1112, August 1989; (4) Waitzman, D., Partridge, C., Deering, S., "Distance Vector Multicasting Routing Protocol," Network Working Group Request for Comments Internet RFC-1075, November 1988; (5) Schulzrinne, H., Casner, S., Frederick, R., Jacobson, V., "RTP: A Transport Protocol for Real-Time Applications," Network Working Group Request for Comments Internet RFC 1889, Jul. 18, 1994. The IP multicast protocol set forth in the IETF RFC 1112 "Host Extensions for IP Multicasting" is the standard protocol for enabling hosts to establish and conduct IP multicast sessions on the Internet. The IETF RFC 1075, "Distance Vector Multicast Routing Protocol (DVMRP)," describes a protocol for propagating routing information among multicast-enabled routers.

The multicast backbone on the Internet (Mbone) is an extension of the Internet backbone to support IP multicasting. The Mbone is formed collectively by the portion of the network routers in the Internet backbone that are programmed to perform the IP multicast routing protocol. Those routers in the Internet backbone that are programmed to handle IP multicast sessions, as well as unicast sessions, are referred to herein as multicast-enabled routers. The Mbone is a virtual network that is layered on top of sections of the physical Internet. It is composed of islands of multicast-enabled routers connected to each other by virtual point-to-point links called "tunnels." The tunnels allow multicast traffic to pass through the non-multicast-enabled routers of the Internet. IP multicast packets are encapsulated as IP-over-IP, so that they look like normal unicast packets to the intervening routers. The encapsulation is added upon entry to a tunnel and removed upon exit from a tunnel. This set of multicast-enabled routers, their directly connected subnetworks, and the interconnecting tunnels define the Mbone. For additional details, see (1) Corner, Douglas E. Internetworking with TCP/IP: Volume 1-Principles, Protocols, and Architecture, Third Edition. Englewood Cliffs, N.J.: Prentice Hall, 1995; (2) Finlayson, Ross, "The UDP Multicast Tunneling Protocol", IETF Network Working Group Internet-Draft, published Sep. 9, 1998, http://search.ietf.org/internet-drafts/draft-finlayson-umtp-03.txt; and (3) Eriksson, Hans, "MBone: The Multicast Backbone," Communications of the ACM, August 1994, Vol. 37, pp. 54-60.

Since the multicast-enabled routers of the Mbone and the non-multicast-enabled routers of the Internet backbone have different topologies, multicast-enabled routers execute a separate routing protocol to decide how to forward multicast packets. The majority of the Mbone routers use the Distance Vector Multicast Routing Protocol (DVMRP), although some portions of the Mbone execute either Multicast OSPF (MOSPF) or the Protocol-Independent Multicast (PIM) routing protocols. For more details about PIM, see: Deering, S., Estrin, D., Farrinaci, D., Jacobson, V., Liu, C., Wei, L., "Protocol Independent Multicasting (PIM): Protocol Specification", IETF Network Working Group Internet Draft, January, 1995.

Multicasting on the Internet has a unique loss environment. On a particular path the losses occur in bursts, as multicast-enabled routers become congested, rather than the losses having the characteristics associated with white noise. When packets are lost on a particular link in the multicast tree, any downstream receivers lose the same packet. Therefore, a large number of retransmissions may occur at the same time in response to negative acknowledgments from receivers. One problem is that such retransmissions are typically in multicast sessions which will tend to encounter the same congested nodes as did the original multicast sessions.

However, congestion in different parts of network is not correlated since traffic to receivers in other parts of the multicast tree does not necessarily pass through the same congested nodes and therefore does not lose the same bursts of packets. Therefore, path diversity would be a good means for recovering at least some of the missing packets, if there were a way to coordinate such a recovery.

Another problem in IP multicasting is that some Internet Service Providers (ISPs) discriminate against multicast packets and discard them before discarding the packets for other services. Therefore, it would be worthwhile balancing the efficiency of multicast transmissions with the quality of point-to-point transmissions.

What is needed is a way to improve the quality of audio and video multicasts of live conferences, news broadcasts and similar material from one source to many receivers over the Internet. Live audio and video material is not as interactive as a telephone conversation, for example, and therefore, a few seconds of delay can be tolerated to recover missing packets. What is needed is a way to recover as many packets as possible with a limited amount of work and delay, rather than to do whatever is necessary for a perfect recovery of all missing packets.

SUMMARY OF THE INVENTION

The invention is a system and method for the repair of IP multicast sessions. In one aspect of the invention a repair server polls multiple transmit servers to accumulate as many of the packets missing from the multicast session as possible. A network includes a source of multicast packets in a multicast session and a plurality of multicast recipients in that session. A repair server in the network provides the packets it receives to the recipients. The repair server includes a missing packet detector. There is a plurality of retransmit servers in the network buffering portions of the packets they respectively receive during the session. The repair server maintains an ordered list of the retransmit servers that are most likely to have buffered copies of packets missing from the session. When the repair server detects that there are packets missing from the session it has received, it uses the ordered list to sequentially request the missing packets from respective ones of the plurality of retransmit servers.

The ranking criteria that the repair server can apply to rank the respective retransmit servers in its ordered list can be based on the performance of the retransmit servers in past repair sessions. Alternately, the ranking criteria can be based on receiver reports multicast by each of the retransmit servers. For example, multicast receiver reports from the retransmit servers include the fraction of data packets from the source lost by a retransmit server, the cumulative number of packets from the source that have been lost by a retransmit server, an estimate of the statistical variance of the packet interarrival time experienced by a retransmit server, and the round trip propagation delay between the source and a retransmit server which may be used as an approximate measure of distance between the source and the retransmit server. any of these metrics can be used by the repair server as the criterion for ranking the plurality of retransmit servers.

Since corrections provided by the invention are implemented by network based servers, the quality of a multicast transmission is improved without changing or adding to the software in either the multicast source or the recipient receivers. This is a major improvement between the invention and prior proposed techniques. If the sources are communicating using Real-Time Transport Protocol (RTP), real video, real audio, or some other multicasting protocol before the repair is performed, they continue to use the same protocols after the repair. Aside from the improved quality of the received signal, the sources and recipient receivers do not see any change.

Both the original, unrepaired multicast session and the repaired multicast session are available to the recipient's receiver on different multicast addresses, allowing the recipient to selectively subscribe to the repaired multicast session as a network supplied service.

In another aspect of the invention, the retransmit server retransmits the missing packets in bypass mode, because multicast enabled servers in the network are experiencing congestion, the defect that likely caused the failure of the original multicast transmit of the packets. The network includes a long-haul portion with multicast enabled routers and non-multicast enabled routers. The network further includes a source of multicast packets in a multicast session coupled to a first node of the long-haul portion. The network further includes a plurality of multicast recipients in that session coupled to a second node of the long-haul portion. The multicast session repair system includes a repair server in the network providing the packets it receives in the multicast session to the recipients. The repair server includes a missing packet detector. A plurality of retransmit servers in the network buffer portions of the packets they respectively receive during the multicast session. The repair server detects that packets are missing from the session it receives and in response, it sequentially requests the missing packets from respective ones of the plurality of retransmit servers. In accordance with the invention, in response to the requests, a message processor in at least one of the retransmit servers, retransmits in a bypass session to the repair server, at least a portion the missing packets. The retransmitted packets in the bypass session are forwarded to circumvent at least some of the congested, multicast enabled routers in the long-haul portion. This can be accomplished by transmitting the missing packets over a separate dial-up network or a private virtual network from the retransmit servers to the repair server. Another way this can be accomplished is by transmitting the missing packets in a unicast session from the retransmit servers to the repair server. The unicast response enables non-multicast routers in the Internet backbone to handle the response, thereby circumventing congested multicast-enabled routers.

In still another aspect of the invention, the retransmit server and the repair server set up a repair dialog in response to the request from the repair server for missing packets. The request indicates the number of missing packets at the repair server. The retransmit server can anticipate the degree of loss which may occur to packets in its response back to the repair server. The retransmit server can adaptively add redundant packets and/or add a forward error correction code (FEC) to its response in proportion to the anticipated probability of loss in transmission. The retransmit server can choose to increase the reliability of its response by (1) adding redundant packets, (2) interleaving the order of the redundant packets over time, (3) adding error detecting parity codes, and/or (4) adding forward error correcting codes that locate and correct transmission errors. Still further, the repair server and the retransmit server can begin a continuing session wherein the retransmit server continuously transmits an enhanced reliability stream of packets that are supplemented by redundant packets and/or forward error correction coding. The period of the enhanced reliability session between the retransmit server and the repair server can continue for as long as the packet loss syndrome is detected at the repair server.

DESCRIPTION OF THE FIGURES

FIG. 2D illustrates the RTCP source description packet periodically output by the multicast source.

FIG. 2E illustrates the RTCP sender report packet periodically output by the multicast source.

FIG. 2F illustrates the packets in the repaired multicast session 111' constructed by the repair server, which appear to the recipient receivers to be the same Group_1 session transmitted from source, having the same multicast IP address and port number as that for the original packet stream of FIG. 2A.

FIG. 3E shows the RTCP report packet that is periodically output by the first retransmit server, reporting on the condition of the multicast Group_1 session packets received at the retransmit server.

FIG. 3F shows the RTCP report packet that is periodically output by the second retransmit server, reporting on the condition of the multicast Group_1 session packets received at the retransmit server.

FIG. 3G shows the RTCP report packet that is periodically output by the third retransmit server, reporting on the condition of the multicast Group_1 session packets received at the retransmit server.

FIG. 3H shows the RTCP report packet that is periodically output by the fourth retransmit server, reporting on the condition of the multicast Group_1 session packets received at the retransmit server.

DISCUSSION OF THE PREFERRED EMBODIMENT

Figure 1:
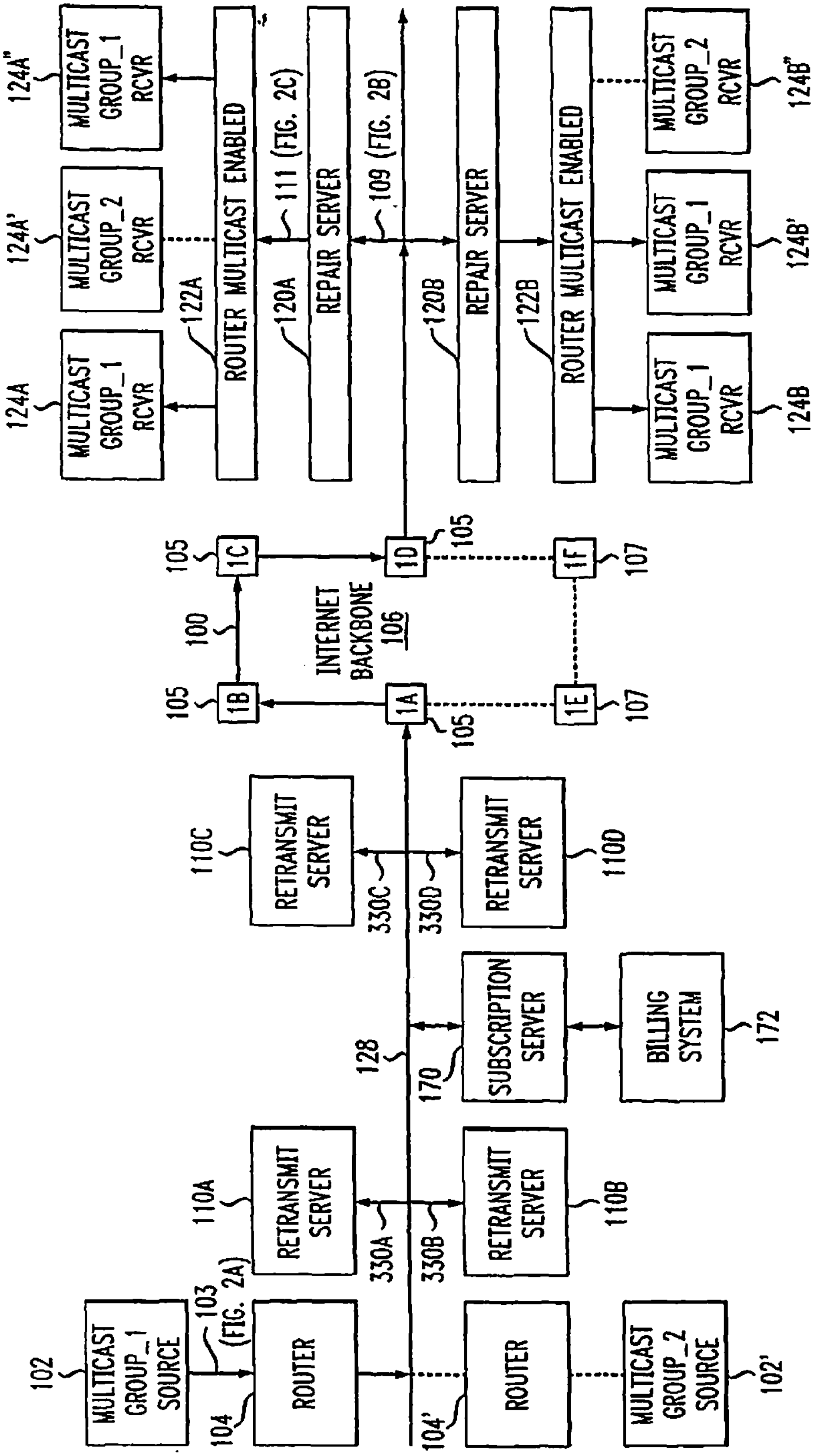
FIG. 1 is an overall network diagram showing the relationship of multicast sources, a plurality of retransmit servers, repair servers, and receivers in the Internet network.
Figure 2A:
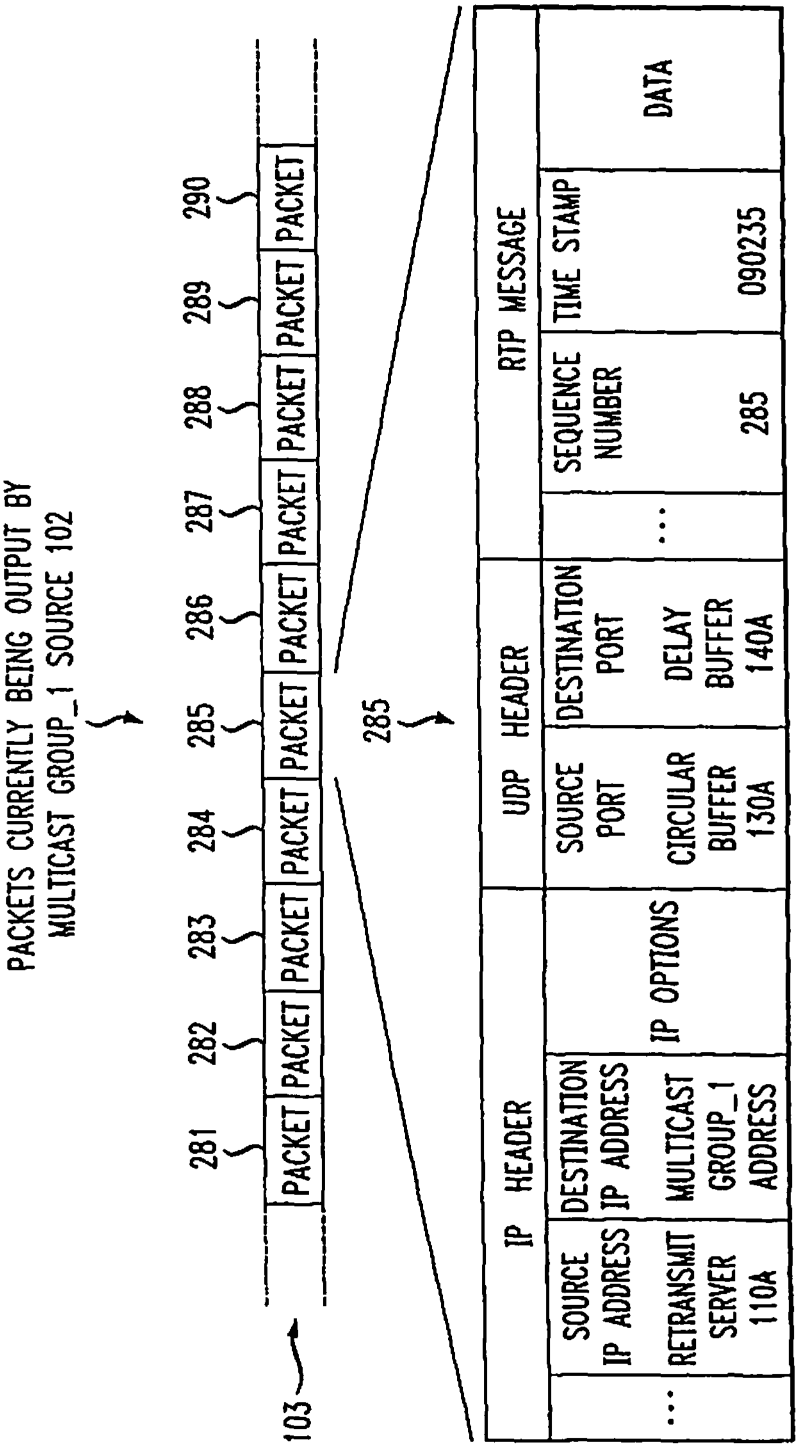
FIG. 2A illustrates the packets currently being output by the multicast source.

FIG. 1 is an overall network diagram showing a multicast source 102 that is transmitting a Group_1 multicast session 100, whose packets 103 are shown in FIG. 2A. FIG. 2A illustrates the packets 103 currently being output by the multicast source 102, with packets 281 to 290 being shown. The packets pass through the multicast enabled router 104 and are output on line 128 to the Internet backbone 106. A second multicast source 102' is shown transmitting a second Group_2 multicast session onto the Internet backbone 106.

Figure 3:
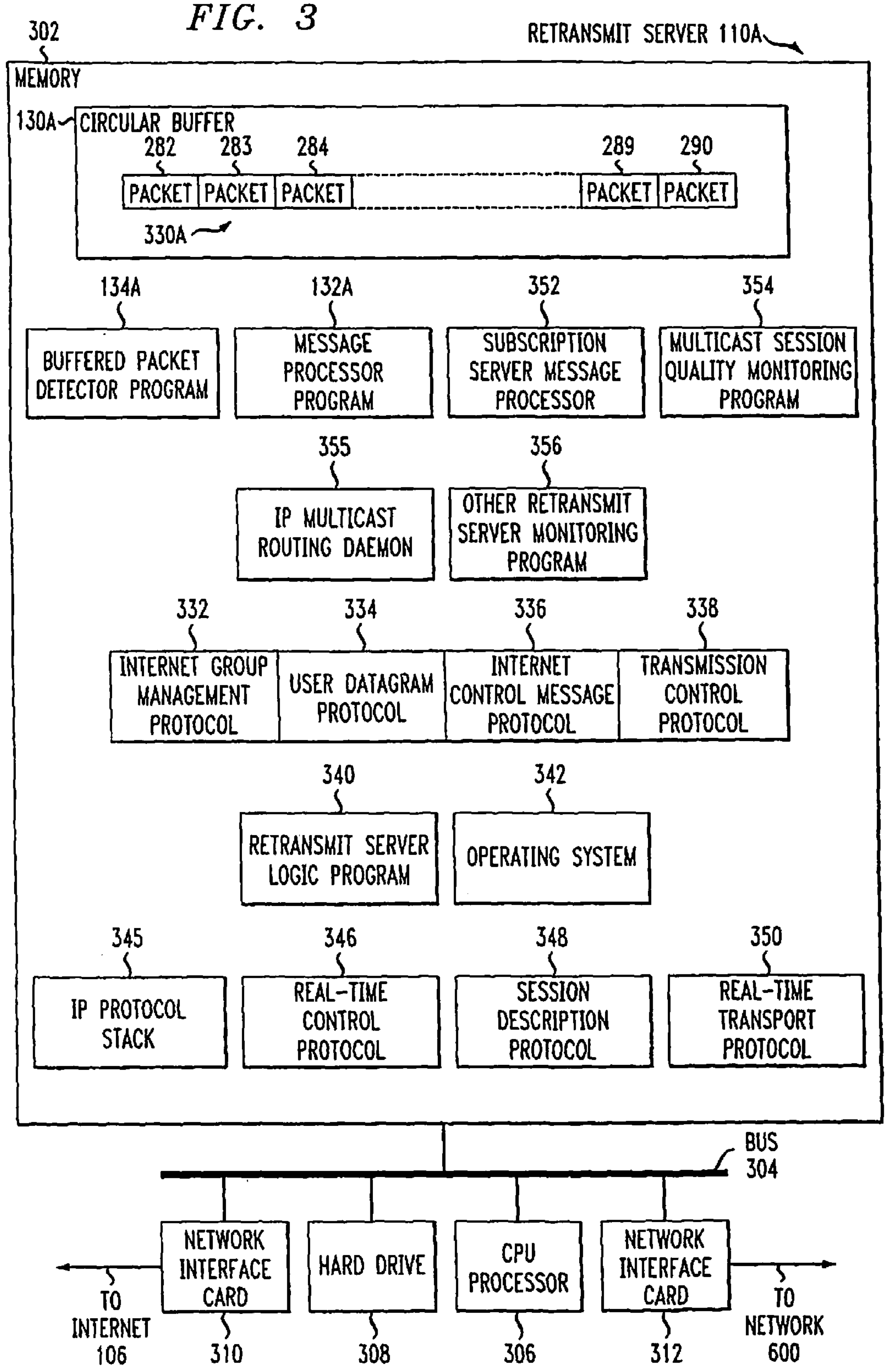
FIG. 3 is a functional block diagram of a retransmit server.
Figure 3A:
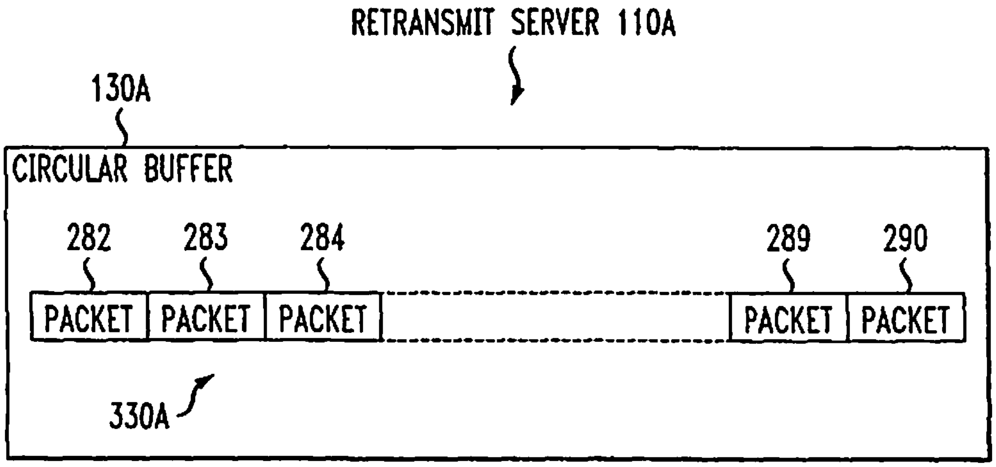
FIG. 3A shows the packets from the session received by the first retransmit server.

A plurality of retransmit servers 110A, 110B, 110C, and 110D are also shown connected to the Internet backbone 106. Each retransmit server, for example 110A in FIG. 1A, includes a circular buffer 130A that stores a running segment of the multicast Group_1 session received from the source 102, for example the most recent three second interval of the received session. The session packet stream 103 sent from the source 102 may undergo some packet losses by the time it reaches the retransmit server 110A. FIG. 3A shows the packets 330A from the Group_1 session received by the first retransmit server 110A, namely packets 282-284 and 289-290. Note that packets 285-288 are missing. Each retransmit server, for example 110A in FIG. 1A, includes a buffered packet detector 134A that can identify the packets that have been received from the Group_1 session. It can also take advantage of the Real-Time Control Protocol (RTCP), discussed below, to estimate the number of packets that have been missed from the session. Each retransmit server, for example 110A in FIG. 1A, includes a message processor 132A that handles message formation and transmission and which handles message receipt and interpretation for message exchanges with other nodes on the network. FIG. 3 is a more detailed functional block diagram of a retransmit server 110A.

Figure 3B:
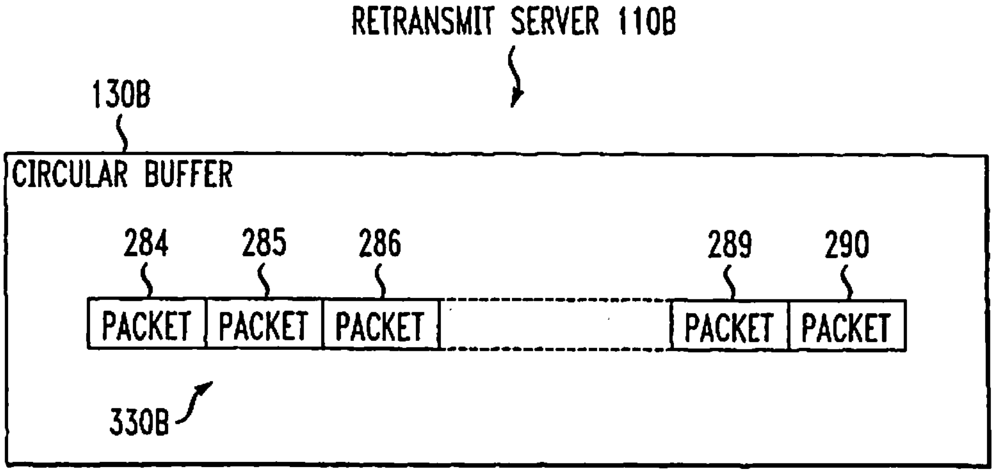
FIG. 3B shows the packets from the session received by the second retransmit server.
Figure 3C:
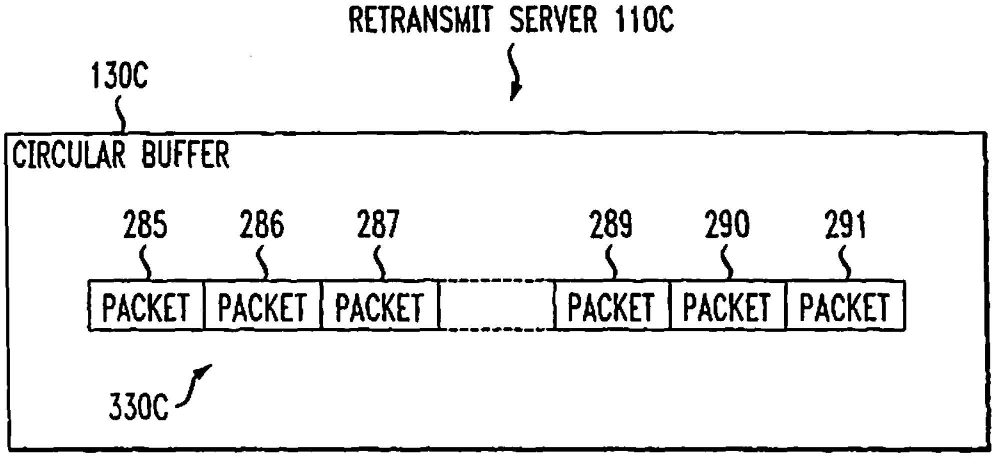
FIG. 3C shows the packets from the session received by the third retransmit server.
Figure 3D:
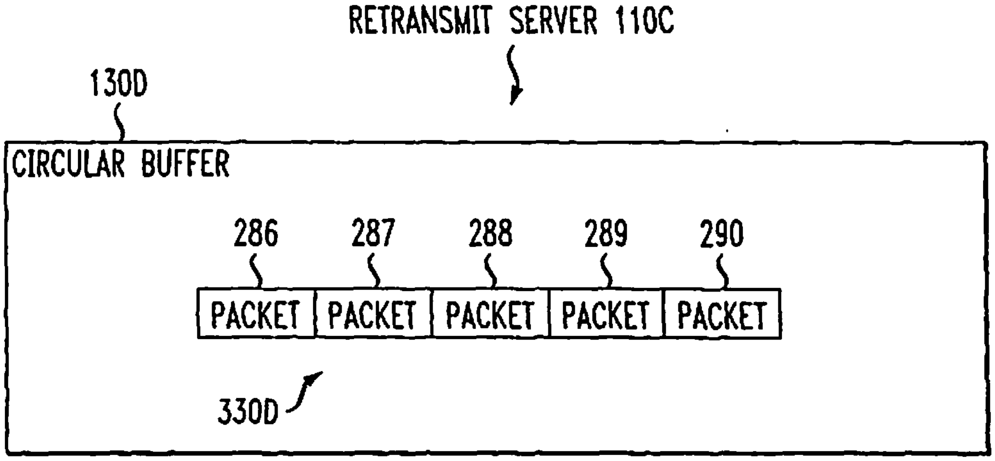
FIG. 3D shows the packets from the session received by the fourth retransmit server.

FIG. 3B shows the packets 330B from the Group_1 session received by the second retransmit server 110B, namely packets 284-286 and 289-290. Note that packets 283, 287 and 288 are missing. FIG. 3C shows the packets 330C from the Group_1 session received by the third retransmit server 110C, namely packets 285-287 and 289-291. Note that packet 283, 284, and 288 are missing. FIG. 3D shows the packets 330D from the Group_1 session received by the fourth retransmit server 110D, namely packets 286-290. Note that packets 283-285 are missing.

The multicast source 102 uses the Real-Time Transport Protocol (RTP) to multicast the packets 103. The Real-Time Transport Protocol (RTP) is carried over User Datagram Protocol (UDP) packets over IP networks from the source 102 to the repair server 120A, and from the source 102 to the retransmit servers 110A, 110B, 110C, and 110D. RTP provides timestamps and sequence numbers. Both the retransmit servers 110A, 110B, 110C, and 110D and the repair server 120A and 120B can use this information to identify when some of the packets 103 are lost or arrive out of sequence. RTP also supports payload type identification, synchronization, encryption and multiplexing and demultiplexing on a per-user basis. For more detailed information on RTP, see (1) Schulzrinne, H., Casner, S., Frederick, R., Jacobson, V., "RTP: A Transport Protocol for Real-Time Applications", Network Working Group Request for Comments Internet RFC 1889, January 1996; (2) Kosiur, D. "IP Multicasting: The Complete Guide to Corporate Networks", Wiley, 1998.

FIG. 2D illustrates the RTCP source description packet 103' periodically output by the multicast source 102. FIG. 2E illustrates the RTCP sender report packet 103" periodically output by the multicast source 102. The Real-Time Control Protocol (RTCP) is the control protocol that is used in conjunction with RTP. Senders 102 can report the number of packets and bytes that are sent. Receivers can report on the loss, delay, and observed jitter (per sender). Other functions include media synchronization, network time protocol (NTP) and RTP timestamp correlation, and session control. For more details on RTCP, see (1) Kosiur, D., "IP Multicasting: The Complete Guide to Corporate Networks", Wiley, 1998; and (2) Thomas, S., "Ipng and the TCP/IP Protocols: Implementing the Next Generation Internet", Wiley, 1996.

The RTCP source description packet 103' of FIG. 2D periodically describes in the TOOL field the media tool or application in the source 102 that is generating the packets 103, such as an MPEG2 video and audio compression program. The RTCP source description packet 103' can also describe in the NOTE field the current state of the source, such as the current number of audio channels included in the MPEG2 transmission.

The RTCP sender report packet 103" in FIG. 2E periodically reports the sender's packet count for the source 102. This is the total number of RTP data packets transmitted by the source 102 since starting transmission up until the time this packet 103" was generated. The RTCP sender report packet 103" in FIG. 2E also periodically reports the sender's octet count for the source 102. This is the total number of payload octets (i.e., not including header or padding) transmitted in RTP data packets by the source 102 since starting transmission up until the time this packet 103" was generated. This field can be used to estimate the average payload data rate.

The retransmit servers periodically transmit RTCP receiver reports on the quality of the multicast Group_1 session as received from the source 102. FIG. 3E shows the RTCP receiver report packet 360A that is periodically output by the retransmit server 110A, reporting on the condition of the multicast Group_1 session packets 330A received at the retransmit server. FIG. 3F shows the RTCP receiver report packet 360B that is periodically output by the retransmit server 110B, reporting on the condition of the multicast Group_1 session packets 330B received at the retransmit server. FIG. 3G shows the RTCP receiver report packet 360C that is periodically output by the retransmit server 110C, reporting on the condition of the multicast Group_1 session packets 330C received at the retransmit server. FIG. 3H shows the RTCP receiver report packet 360D that is periodically output by the retransmit server 110D, reporting on the condition of the multicast Group_1 session packets 330D received at the retransmit server.

The format of the receiver report (RR) packet is substantially the same as that of the sender report (SR) packet except for minor differences, and except that the packet type field indicates that it is a receiver report. The remaining fields have the same meaning as for the SR packet. The RTCP receiver report includes the SSRC_n (source identifier) field that identifies the source 102 to which the information in this reception report pertains. The RTCP receiver report includes the fraction lost field which provides the fraction of RTP data packets from source SSRC_n lost since the previous SR or RR packet was sent. This fraction is defined to be the number of packets lost divided by the number of packets expected, as defined below. The RTCP receiver report includes the cumulative number of packets lost field, which provides the total number of RTP data packets from source SSRC_n that have been lost since the beginning of reception. This number is defined to be the number of packets expected less the number of packets actually received, where the number of packets received includes any which are late or duplicates. Thus packets that arrive late are not counted as lost, and the loss may be negative if there are duplicates. The number of packets expected is defined to be the extended last sequence number received, as defined next, less the initial sequence number received. The RTCP receiver report includes the extended highest sequence number received field, which provides the highest sequence number received in an RTP data packet from source SSRC_n. The RTCP receiver report includes the interarrival jitter field which provides an estimate of the statistical variance of the RTP data packet interarrival time, measured in timestamp units and expressed as an unsigned integer. The interarrival jitter J is defined to be the mean deviation (smoothed absolute value) of the difference D in packet spacing at the receiver compared to the sender for a pair of packets. This is equivalent to the difference in the "relative transit time" for the two packets; the relative transit time is the difference between a packet's RTP timestamp and the receiver's clock at the time of arrival, measured in the same units. The interarrival jitter is calculated continuously as each data packet i is received from source SSRC_n, using this difference D for that packet and the previous packet i−1 in order of arrival (not necessarily in sequence). Whenever a reception report is issued, the current value of J is sampled. The RTCP receiver report includes the last SR timestamp (LSR) field that provides the NTP timestamp received as part of the most recent RTCP sender report (SR) packet from source SSRC_n. The RTCP receiver report includes the delay since last SR (DLSR) field, which provides the delay, between receiving the last SR packet from source SSRC_n and sending this reception report. Let SSRC_r denote the receiver issuing this receiver report. Source SSRC_n can compute the round-trip propagation delay to SSRC_r by recording the time A when this reception report is received. It calculates the total round-trip time A-LSR using the last SR timestamp (LSR) field, and then subtracting this field to leave the round-trip propagation delay as (A−LSR−DLSR). This information can be transferred from the source 102 to the retransmit server 110A in the RTCP sender report or the RTCP source description. This field in the RTCP receiver report from the retransmit server 110A may be used as an approximate measure of distance between the source 102 and the retransmit server 110A, although some links have very asymmetric delays. For more details on RTCP, see Schulzrinne, H., Casner, S., Frederick, R., Jacobson, V., "RTP: A Transport Protocol for Real-Time Applications," Network Working Group Request for Comments Internet RFC 1889, Jul. 18, 1994.

In FIG. 1, the Internet backbone is shown including a first path that includes multicast-enabled routers 105, respectively labeled 1A, 1B, 1C, and 1D, forming the Mbone portion that can handle IP multicast sessions, such as Group_1 session 100. The Internet backbone is also shown including a second path that includes non-multicast-enabled routers 107, respectively labeled 1E and 1F, which cannot can handle IP multicast sessions. Because heavy multicast traffic levels occur that can only be handled by the multicast-enabled routers 105, these routers tend to see high levels of congestion more often that do the non-multicast-enabled routers 107.

Figure 2B:
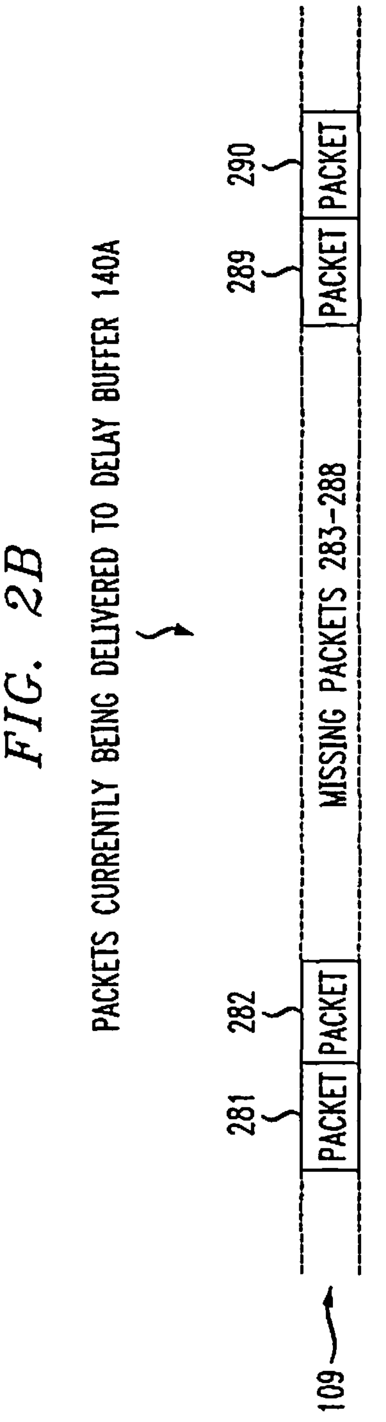
FIG. 2B illustrates the packets currently being delivered to the repair server.
Figure 2C:
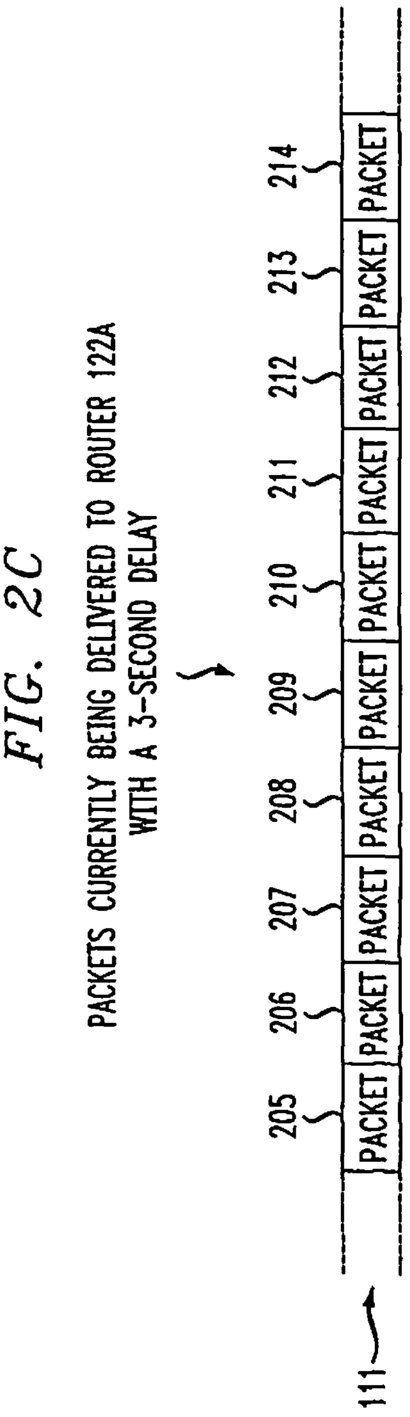
FIG. 2C illustrates the packets currently being delivered to the recipients by the repair server.

Repair servers 120A and 120B are shown in FIG. 1 connected to the Internet backbone 106. FIG. 2B illustrates the packets 109 currently being delivered to the repair server 120A, namely packets 281, 282, 289, and 290. Note that packets 283-288 are missing from the received session. A plurality of receivers 124A, 124A', and 124A" are shown connected through the multicast-enabled router 122A to the repair server 120A. Receivers 124A and 124A" are receiving the Group_1 session. FIG. 2C illustrates the packets 111 currently being delivered to the recipients at receivers 124A and 124A" by the repair server 120A, namely packets 205-214 which are being buffered for a three second delay in the repair server 120A, before being multicast to receivers 124A and 124K. Receiver 124A' is shown receiving the second multicast Group_2 session from repair server 120A.

FIG. 1 also shows a second plurality of receivers 124B, 124B', and 124B" are shown connected through the multicast-enabled router 122B to the repair server 120B. Receivers 124B and 124B' are receiving the Group_1 session and receiver 124B" is receiving the Group_2 session. FIG. 1 also shows a subscription server 170 connected between the Internet backbone 106 and the billing system 172.

Figure 1A:
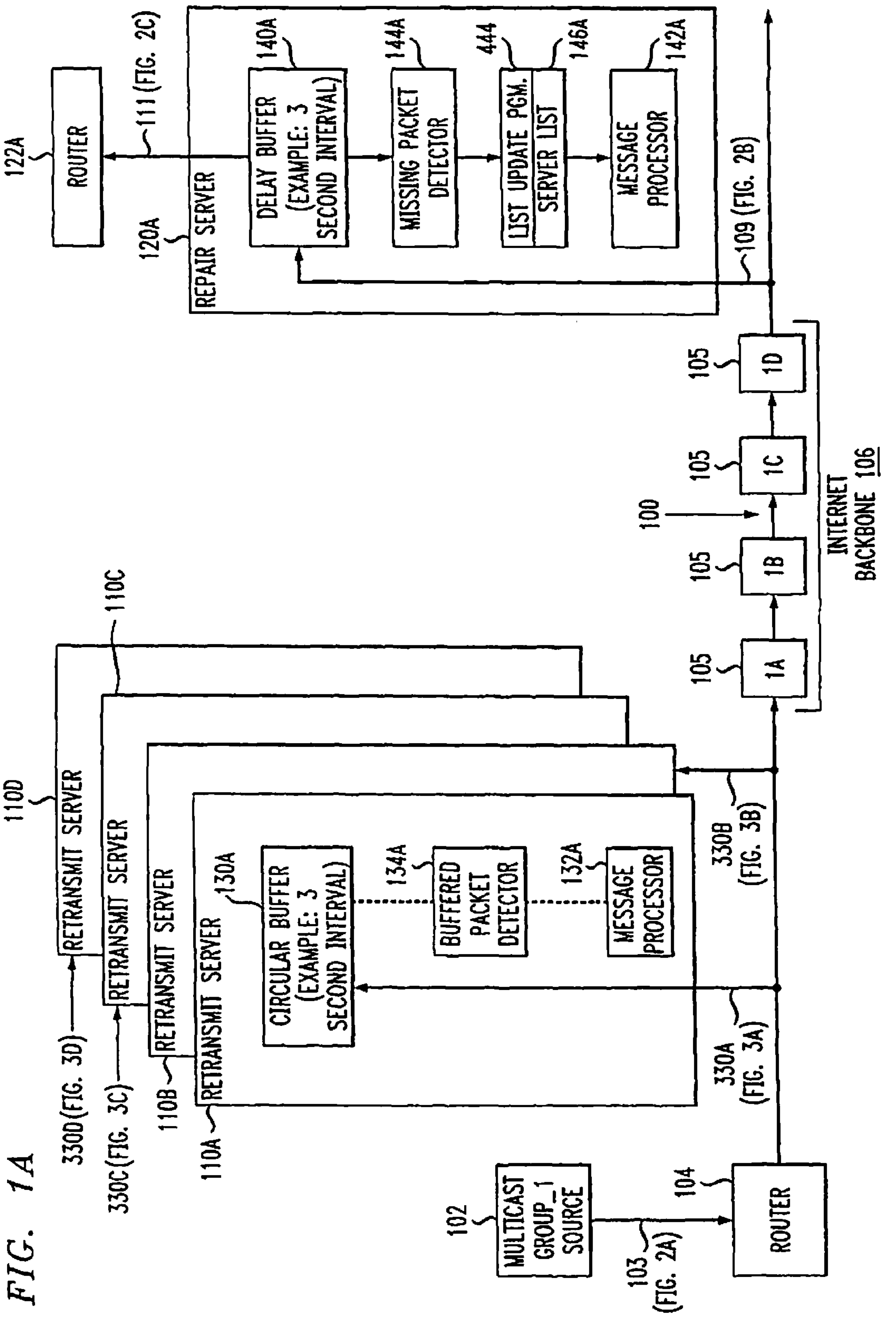
FIG. 1A is a more detailed diagram of the network of FIG. 1, showing a multicast session being transmitted from a source, whose packets are being buffered by a plurality of retransmit servers while a repair server provides packets from the session to multicast receivers. The repair server monitors for missing packets in the session it receives and in response to detecting missing packets, it does a table lookup to find the first retransmit server in an ordered list.
Figure 4:
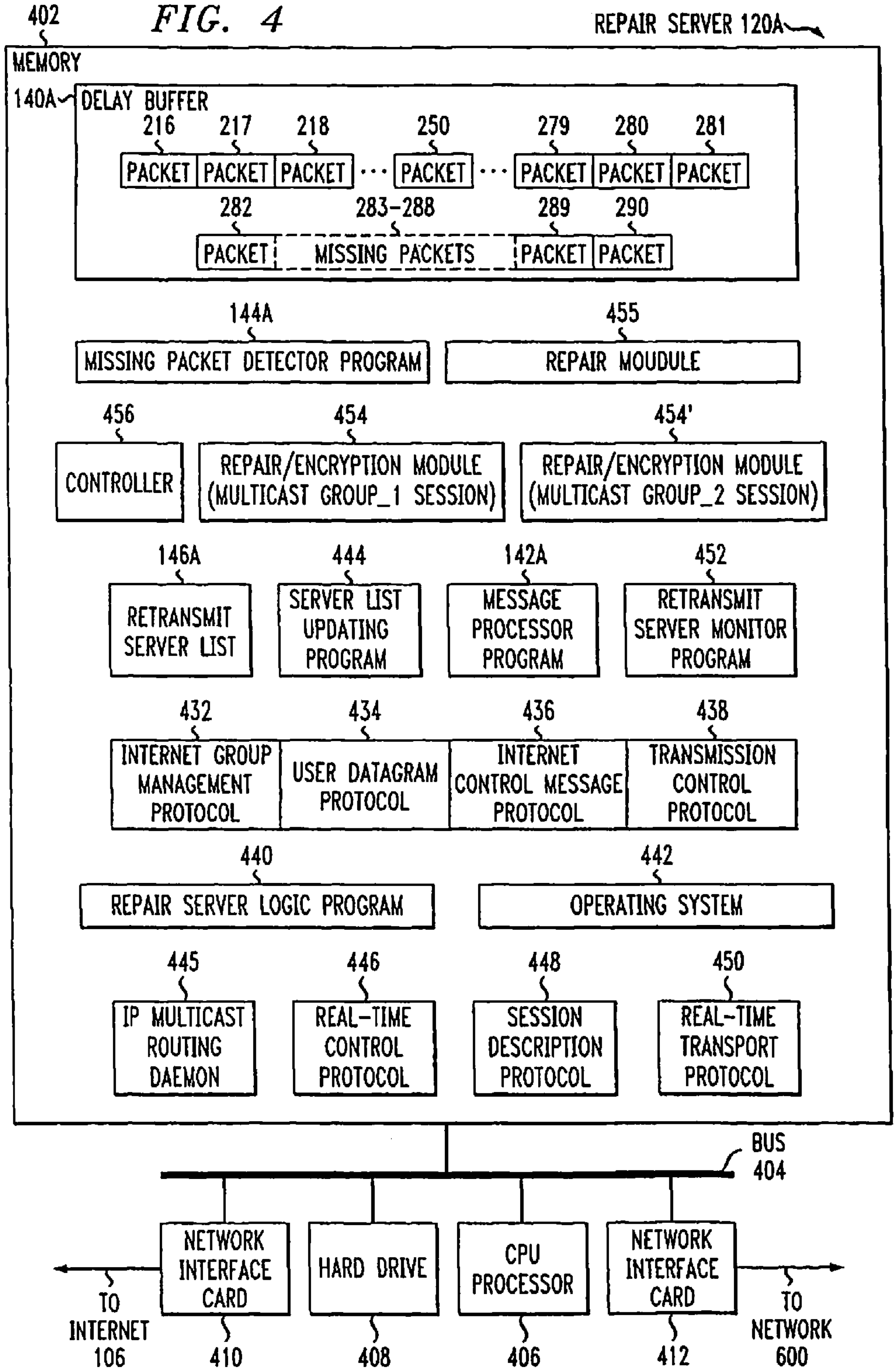
FIG. 4 is a functional block diagram of a repair server.

Each repair server, for example 120A in FIG. 1A, includes a delay buffer 140A that stores a running segment of the multicast Group_1 session received from the source 102, for example the most recent three second interval of the received session. This three second delay is applied to the arriving packets 109 before they are forwarded in multicast mode to the receivers 124A and 124K. The session packet stream 103 sent from the source 102 may undergo some packet losses by the time it reaches the repair server 120A. FIG. 2B shows the packets 109 from the Group_1 session received by the repair server 120A, namely packets 281, 282, 289, and 290. Note that packets 283-288 are missing. Each repair server, for example 120A in FIG. 1A, includes a missing packet detector 144A that can identify the packets that have been lost from the Group_1 session. The retransmit server list 146A is compiled by a server list updating program 444 shown in FIG. 4 and in FIG. 9. The list 146A is an ordered list of the retransmit servers 110A-110D. This list 146A is compiled to enable the repair server 120A to identify which of the several retransmit servers 110A-110D is the most likely one to have the best copy of the Group_1 session packets, in the event that they are needed for repair. The server list updating program 444 can also take advantage of the Real-Time Control Protocol (RTCP), discussed below, to estimate the number of packets that each retransmit server 110A-110D has missed from the session. The server list updating program 444 can apply a number of performance criteria to rank the respective retransmit servers 110A-110D in the server list 146A. Each repair server, for example 120A in FIG. 1A, includes a message processor 142A that handles message formation and transmission and which handles message receipt and interpretation for message exchanges with other nodes on the network. FIG. 4 is a more detailed functional block diagram of a repair server 120A.

The ranking criteria that the server list updating program 444 in the repair server 120A can apply to rank the respective retransmit servers 110A-110D in a server list 146A can be based on the RTCP receiver reports multicast by each of the retransmit servers 110A-110D. For example, FIG. 3E shows the RTCP receiver report packet 360A that is periodically output by the retransmit server 110A, reporting on the condition of the multicast Group_1 session packets 330A received at the retransmit server. The RTCP receiver report includes the fraction lost field which provides the fraction of RTP data packets from source SSRC_n lost by a retransmit server 110A, for example, since the previous SR or RR packet was sent. The RTCP receiver report includes the cumulative number of packets lost field, which provides the total number of RTP data packets from source SSRC_n that have been lost by a retransmit server 110A, for example, since the beginning of reception. The RTCP receiver report includes the interarrival jitter field which provides an estimate of the statistical variance of the RTP data packet interarrival time experienced by a retransmit server 110A, for example, measured in timestamp units and expressed as an unsigned integer. The round propagation delay between the source and a retransmit server 110A, for example, which may be used as an approximate measure of distance between the source 102 and the retransmit server 110A.

Figure 1B:
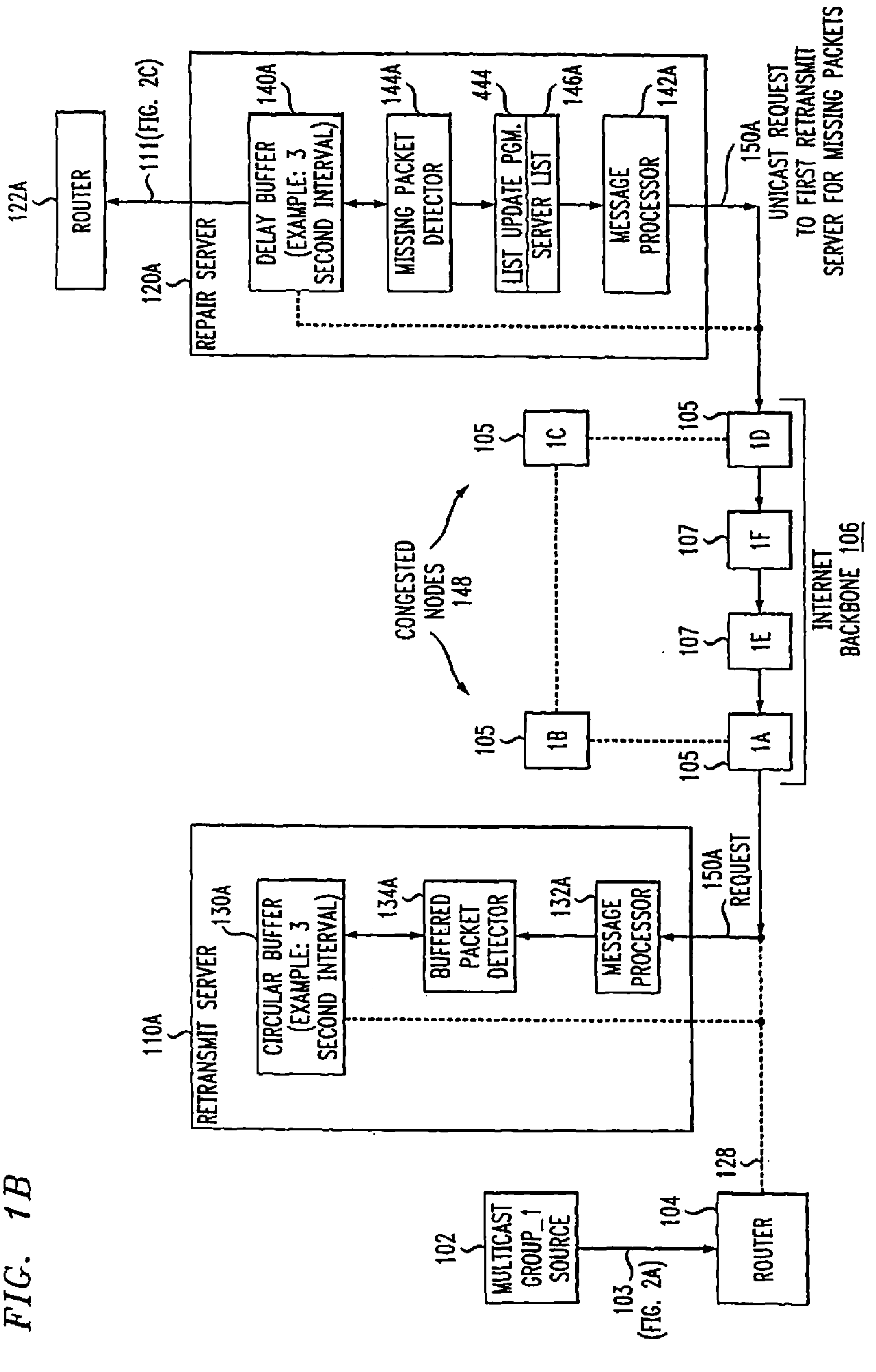
FIG. 1B is a more detailed diagram of the network of FIG. 1, showing the repair server sending a unicast request to the first retransmit server, requesting the missing packets.
Figure 1C:
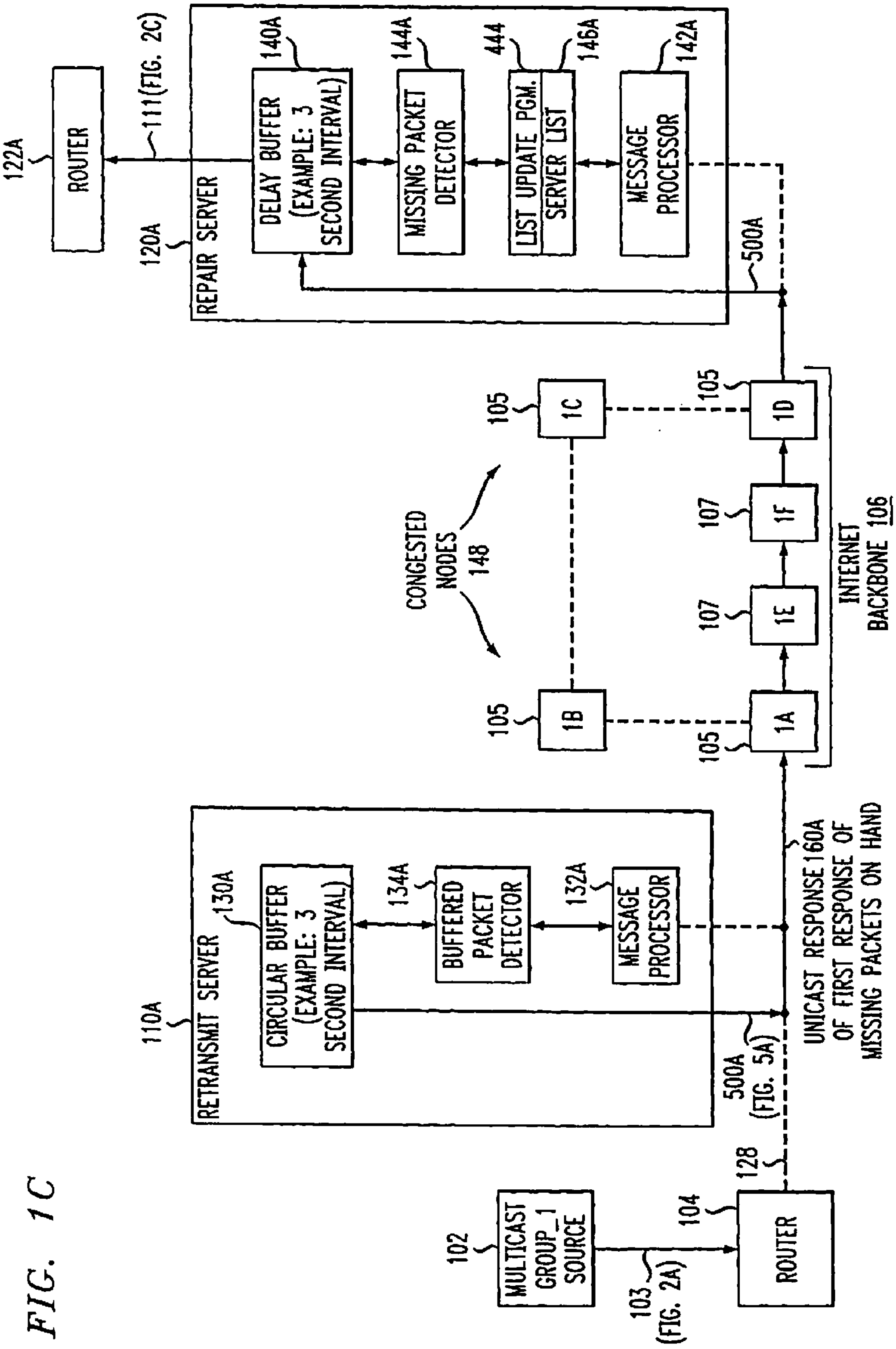
FIG. 1C is a more detailed diagram of the network of FIG. 1, showing the first retransmit server responding to the first request by checking its buffer for the missing packets. The first retransmit server finds a first portion, but not all of the missing packets. In accordance with the invention, the retransmit server sends a unicast response containing the first portion of the missing packets to the repair server. The unicast response enables non-multicast routers in the Internet backbone to handle the response, thereby circumventing congested multicast-enabled routers.
Figure 1D:
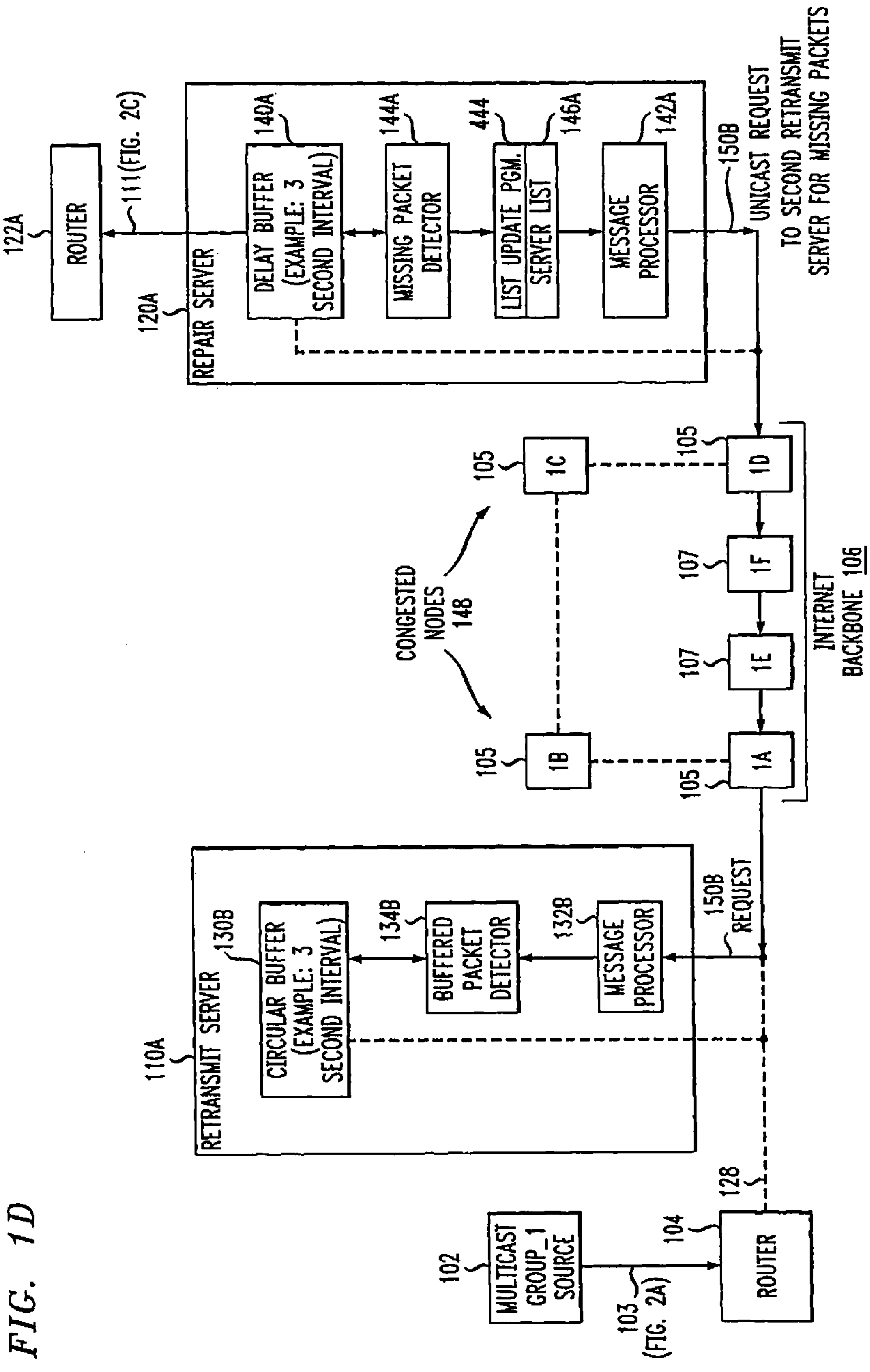
FIG. 1D is a more detailed diagram of the network of FIG. 1, showing the repair server, in accordance with the invention, sending a second unicast request to a second retransmit server in its ordered list, requesting the remaining missing packets.
Figure 1E:
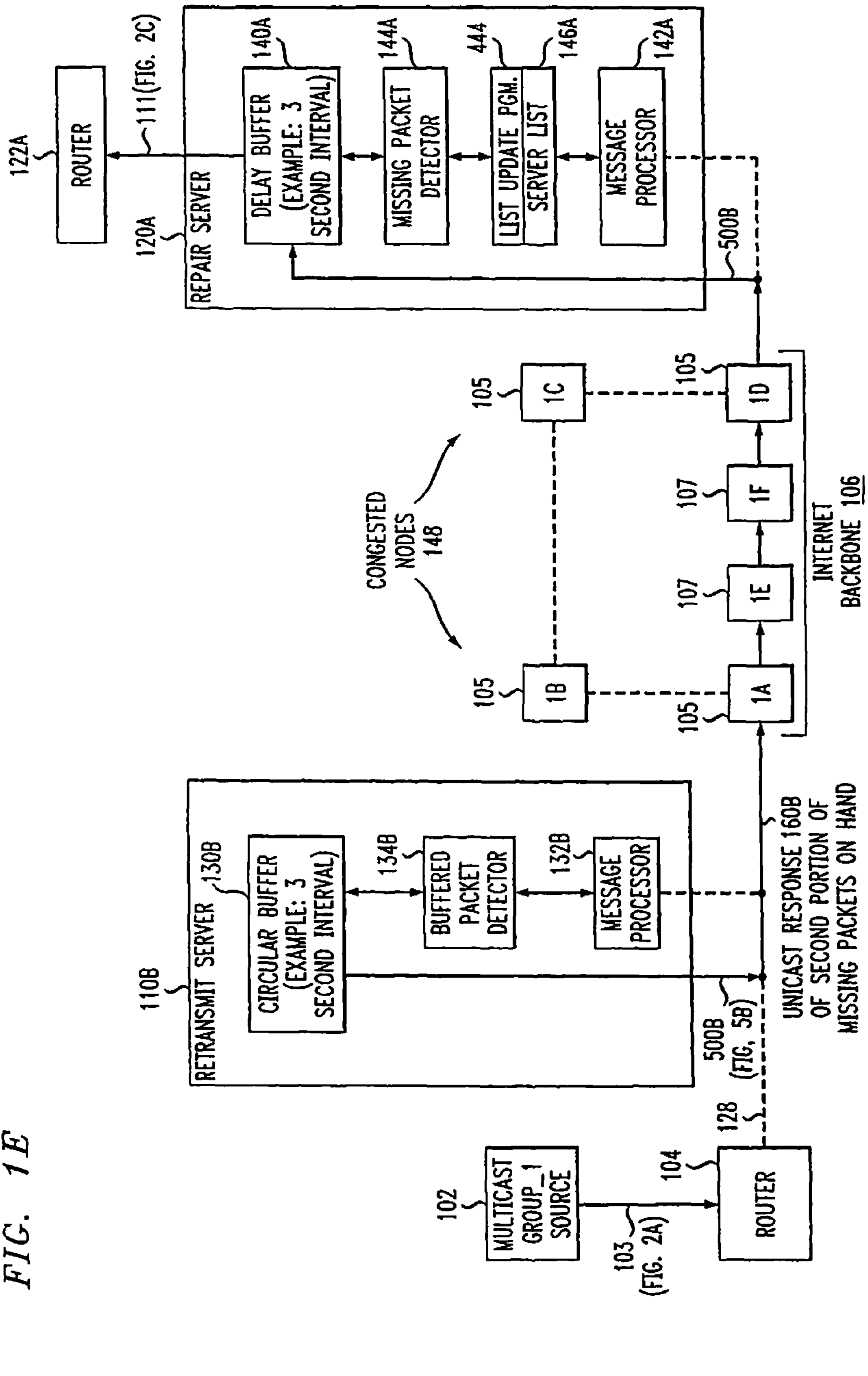
FIG. 1E is a more detailed diagram of the network of FIG. 1, showing the second retransmit server responding to the second request by checking its buffer for the remaining missing packets. The second retransmit server finds a second portion of missing packets. In accordance with the invention, the second retransmit server sends a unicast response containing the second portion of the missing packets to the repair server.
Figure 4A:
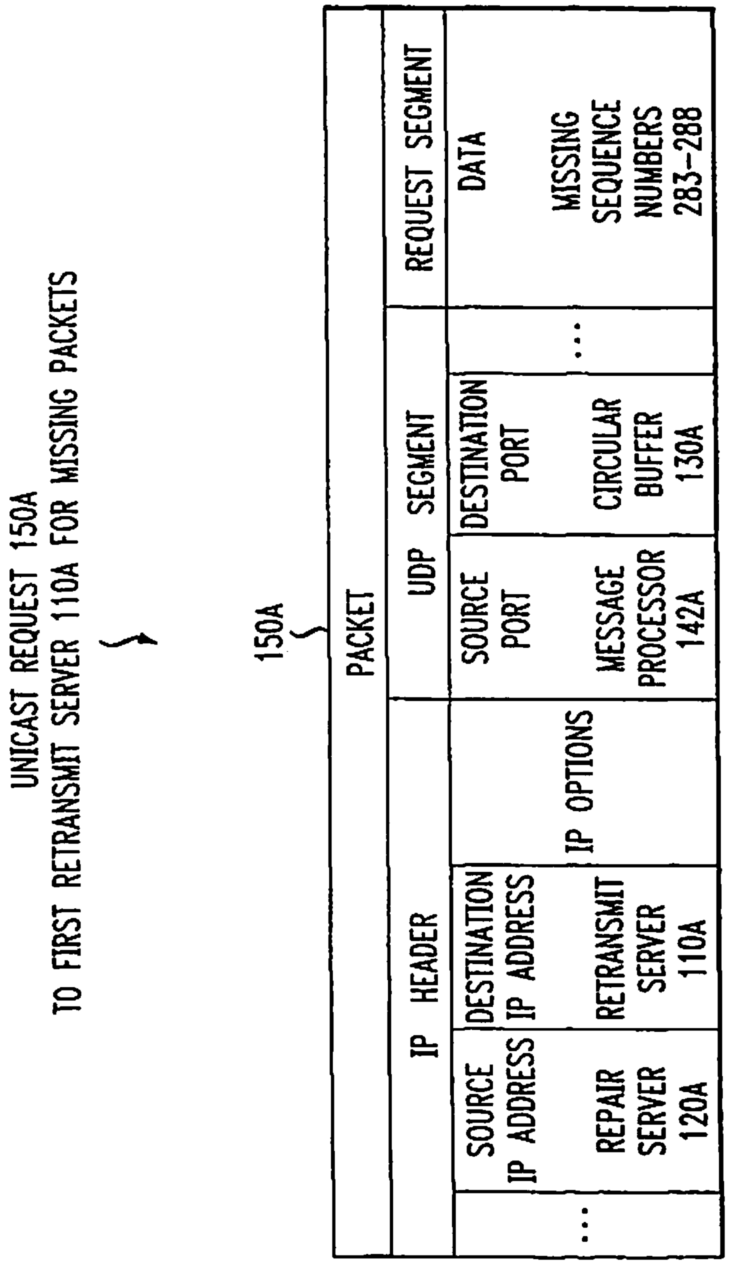
FIG. 4A shows the unicast request 150A from the repair server 120A to the retransmit server 110A for missing packets.
Figure 4B:
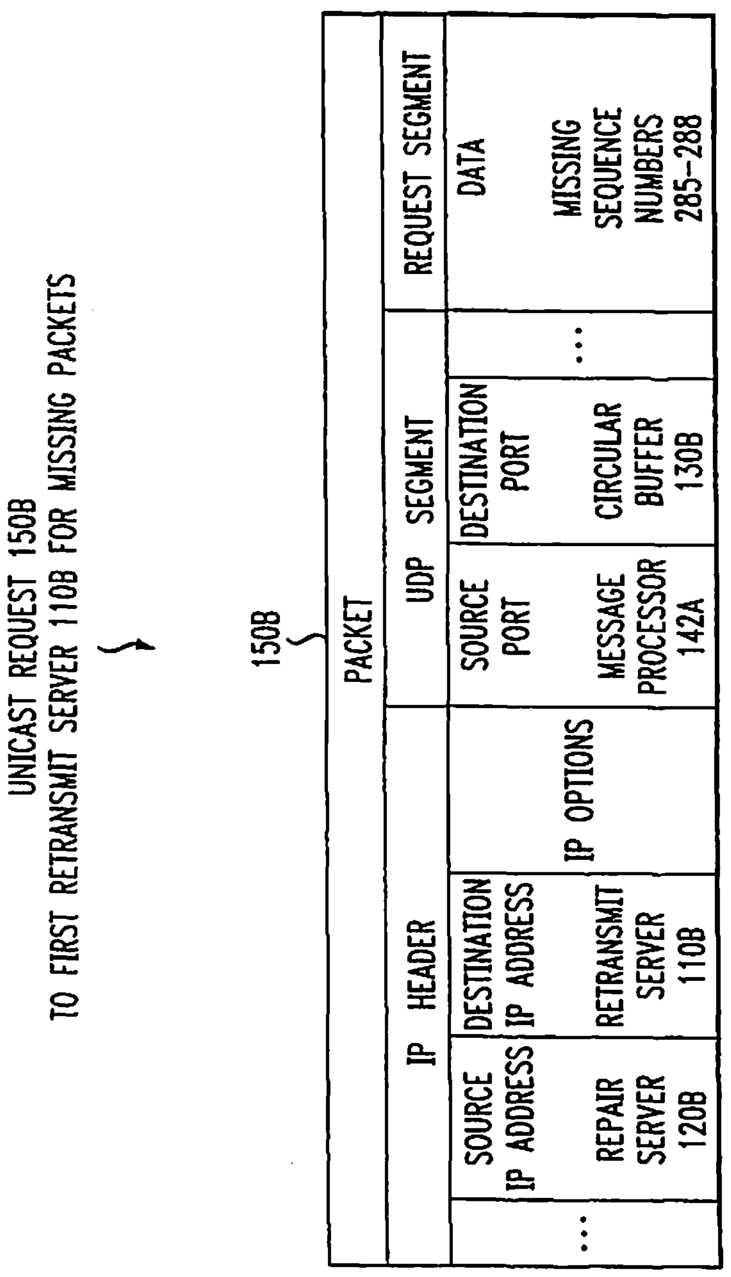
FIG. 4B shows the unicast request 150B from the repair server 120A to the retransmit server 110B for missing packets.
Figure 4C:
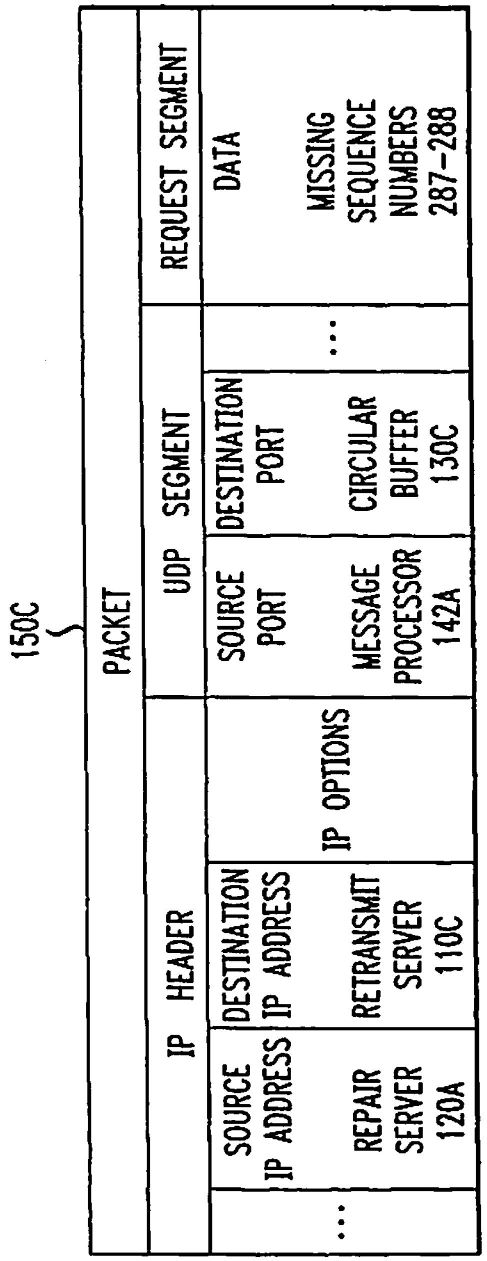
FIG. 4C shows the unicast request 150C from the repair server 120A to the retransmit server 110C for missing packets.
Figure 4D:
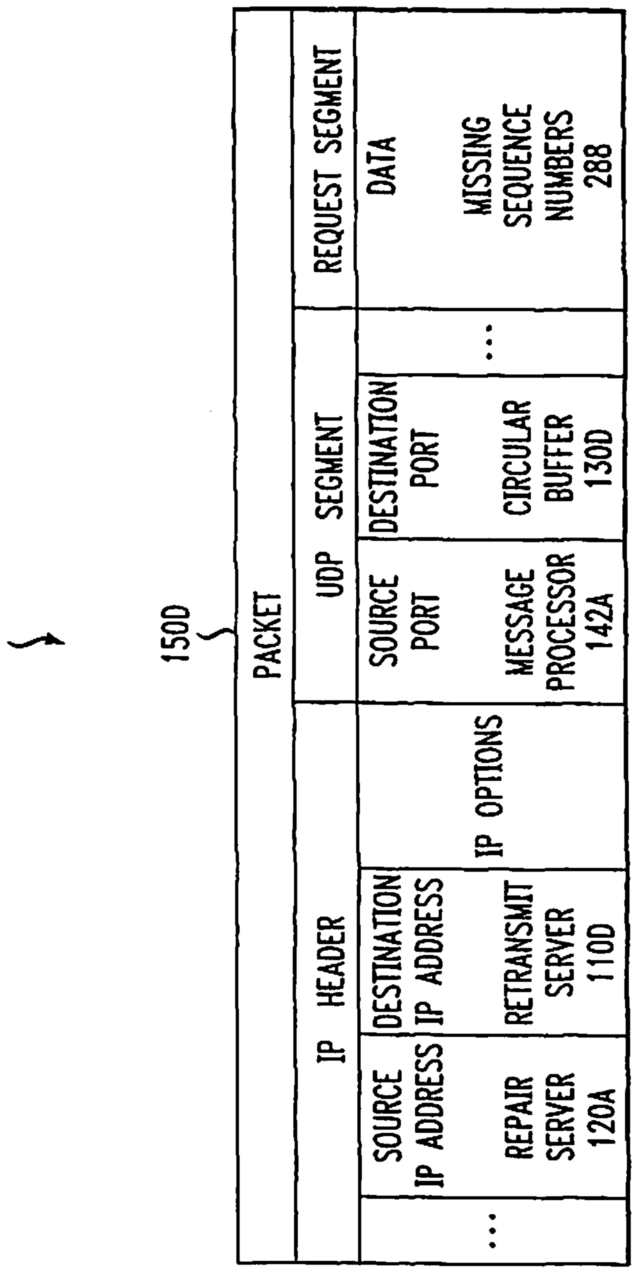
FIG. 4D shows the unicast request 150D from the repair server 120A to the retransmit server 110D for missing packets.
Figure 5A:
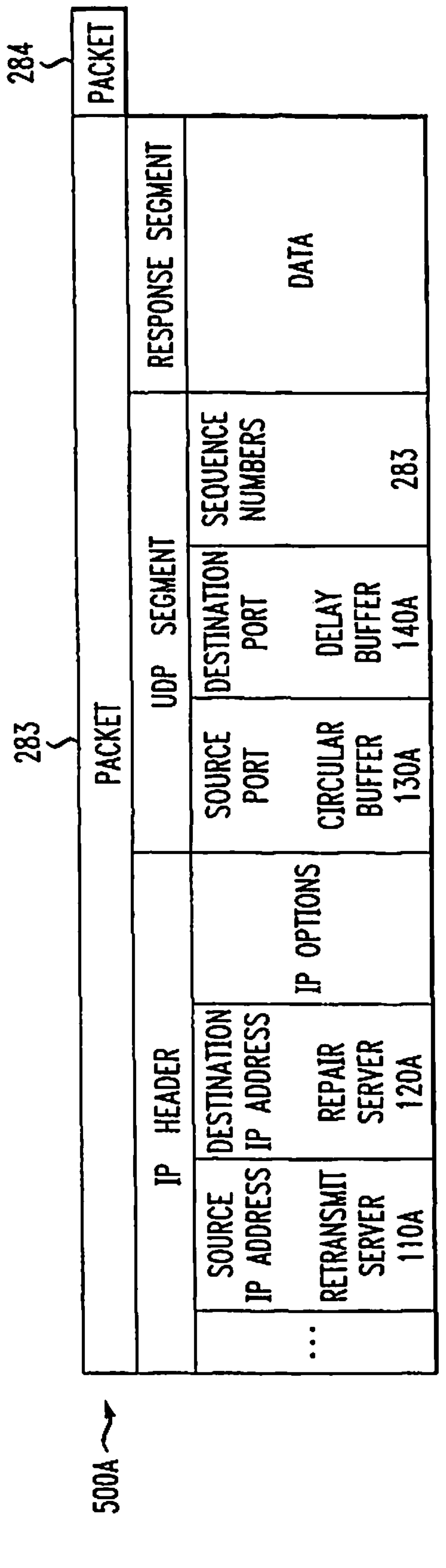
FIG. 5A illustrates the packets in the unicast response of the first portion of missing packets on hand at the first retransmit server.
Figure 5B:
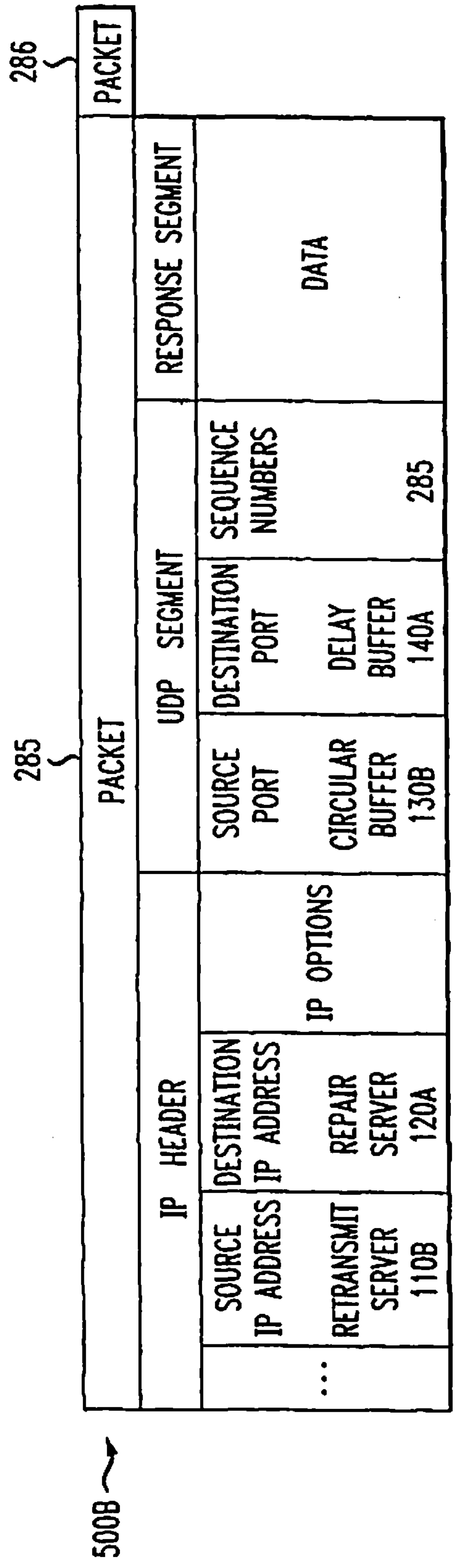
FIG. 5B illustrates the packets in the unicast response of the second portion of missing packets on hand at the second retransmit server.
Figure 5C:
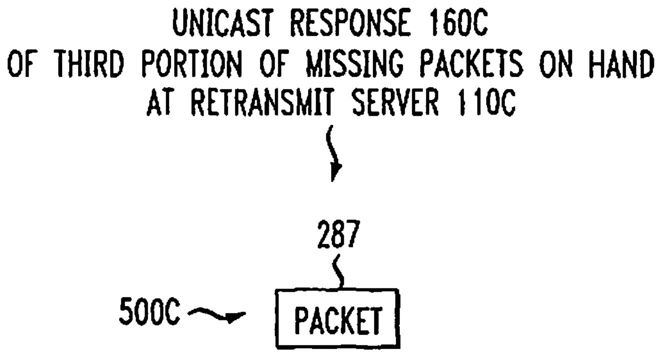
FIG. 5C illustrates the packets in the unicast response of the third portion of missing packets on hand at the third retransmit server.
Figure 5D:
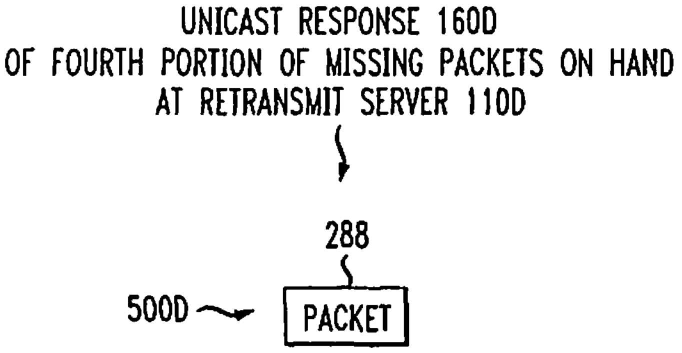
FIG. 5D illustrates the packets in the unicast response of the fourth portion of missing packets on hand at the fourth retransmit server.

The repair server 120A, for example, maintains the ordered list 146A of the retransmission servers 110A-110D that are most likely to have buffered copies of packets missing from the Group_1 session. When the repair server 120A detects that there are packets missing from the session it has received, it uses the ordered list 146A to sequentially request the missing packets from respective ones of the plurality of retransmission servers 110A-110D. Assume for this example that the list 146A places the retransmit servers in the order from highest to lowest as 110A, 110B, 110C, 110D, based on the total packets lost, as reported by the RTCP receive report which is multicast by each respective retransmit server 110A-110D. Since retransmit server 110A has reported that it has the fewest total packets lost (4 packets), it is ranked as the most probable to have buffered copies of the missing packets. FIG. 1B and FIG. 4A show the first unicast request 150A from the repair server 120A to the retransmit server 110A for missing packets. In response, FIG. 1C and FIG. 5A illustrate the packets 500A in the unicast response of the first portion of missing packets on hand at the first retransmit server 110A, namely packets 283 and 284. The recovered packets 283 and 284 are added by the repair server 120A to the delay buffer 140A. However, the missing packet detector 144A detects that packets 285-288 remain missing. Since retransmit server 110B has reported that it has the second fewest total packets lost (5 packets), it is ranked as the second most probable to have buffered copies of the missing packets. FIG. 1D and FIG. 4B show the unicast request 150B from the repair server 120A to the retransmit server 110B for missing packets. In response, FIG. 1E and FIG. 5B illustrate the packets 500B in the unicast response of the second portion of missing packets on hand at the second retransmit server 110B, namely packets 285 and 286. The recovered packets 285 and 286 are added by the repair server 120A to the delay buffer 140A. However, the missing packet detector 144A detects that packets 287 and 288 remain missing. Since retransmit server 110C has reported that it has the third fewest total packets lost (6 packets), it is ranked as the third most probable to have buffered copies of the missing packets. FIG. 4C shows the unicast request 150C from the repair server 120A to the retransmit server 110C for missing packets. In response, FIG. 5C illustrates the packet 500C in the unicast response of the third portion of missing packets on hand at the third retransmit server 110C, namely packet 287. The recovered packet 287 is added by the repair server 120A to the delay buffer 140A. However, the missing packet detector 144A detects that packet 288 remains missing. Since retransmit server 110D has reported that it has the fourth fewest total packets lost (7 packets), it is ranked as the fourth most probable to have buffered copies of the missing packets. FIG. 4D shows the unicast request 150D from the repair server 120A to the retransmit server 110D for missing packets. In response, FIG. 5D illustrates the packet 500D in the unicast response of the fourth portion of missing packets on hand at the fourth retransmit server 110D, namely packet 288.

Each IP multicast source 102 periodically transmits Session Description Protocol (SDP) announcements to inform potential recipients 124A about the existence of a session. In order to join an IP multicast session, software at the receiver 124A, for example, must know the IP address and port of that session. One way this can be done is for the source 102 to periodically announce this information on a well-known IP multicast session. The Session Description Protocol (SDP) used serves two primary purposes: (a) to communicate the existence of a session and (b) to convey sufficient information so end users may join the session. Some of the information included in an SDP datagram is: the name and purpose of the session, time(s) the session is active, the media comprising the session, the transport protocol, the format, and the multicast address and port. Software developers may add other attributes to SDP announcements for specific applications For more detailed information on SDP, see Handley, M. and Jacobson, V., "SDP: Session Description Protocol", Network Working Group Request for Comments Internet RFC 2327, November 1997.

In accordance with the invention, repaired packets are transmitted from the retransmit servers 110A-110D in a unicast session. Then, the repair server 120A forwards the repaired session as a multicast session 111' to the receivers 124A and 124A". The repaired multicast session 111' is constructed by the repair server 120A by combining the packets 109 of FIG. 2B received in the delay buffer 140A with the missing packets received from the retransmit servers 110A-110D. FIG. 5A illustrates the packets 500A in the unicast response of the first portion of missing packets on hand at the first retransmit server 110A, namely packets 283 and 284. FIG. 5B illustrates the packets 500B in the unicast response of the second portion of missing packets on hand at the second retransmit server 110B, namely packets 285 and 286. FIG. 5C illustrates the packets 500C in the unicast response of the third portion of missing packets on hand at the third retransmit server 100*c*, namely packet 287. FIG. 5D illustrates the packets 500D in the unicast response of the fourth portion of missing packets on hand at the fourth retransmit server 110D, namely packet 288.

The repaired multicast session 111' constructed by the repair server 120A resumes using the RTP format as shown in FIG. 2F. FIG. 2F illustrates the packets 111' that are sequentially ordered in the delay buffer in time to be transmitted in a multicast session to the recipient receivers 124A and 124A". For example, missing packets 283 and 284 from the first retransmit server 110A are placed in order following packet 282 in the delay buffer 140A. The delay buffer 140A can be organized for indirect addressing of packets that are buffered at various locations in the buffer 140A. The pointers are sequentially addressed to provide the desired order for the output stream of packets 111'. Each pointer respectively points to a location in the delay buffer 140A where a packet having a sequence number is stored. A first pointer in the output sequence points to packet 282. The next pointer in the output sequence is made to point to the recovered packet 283. The next pointer thereafter in the output sequence is made to point to the recovered packet 284. In this manner, when missing packets are recovered from the retransmit servers, they can be stored at any available location in the delay buffer 140A and the pointer for that packet sequence number is made to point to the storage location of the recovered packet.

The packets in the multicast session 111' of FIG. 2F constructed by the repair server 120A resume using the RTP format. The multicast session 111' can appear to the recipient receivers 124A and 124A" to be the same Group_1 session transmitted from source 102, as is shown in FIG. 2F, having the same multicast IP address and port number as that for the original packet stream 103 of FIG. 2A.

Figure 1F:
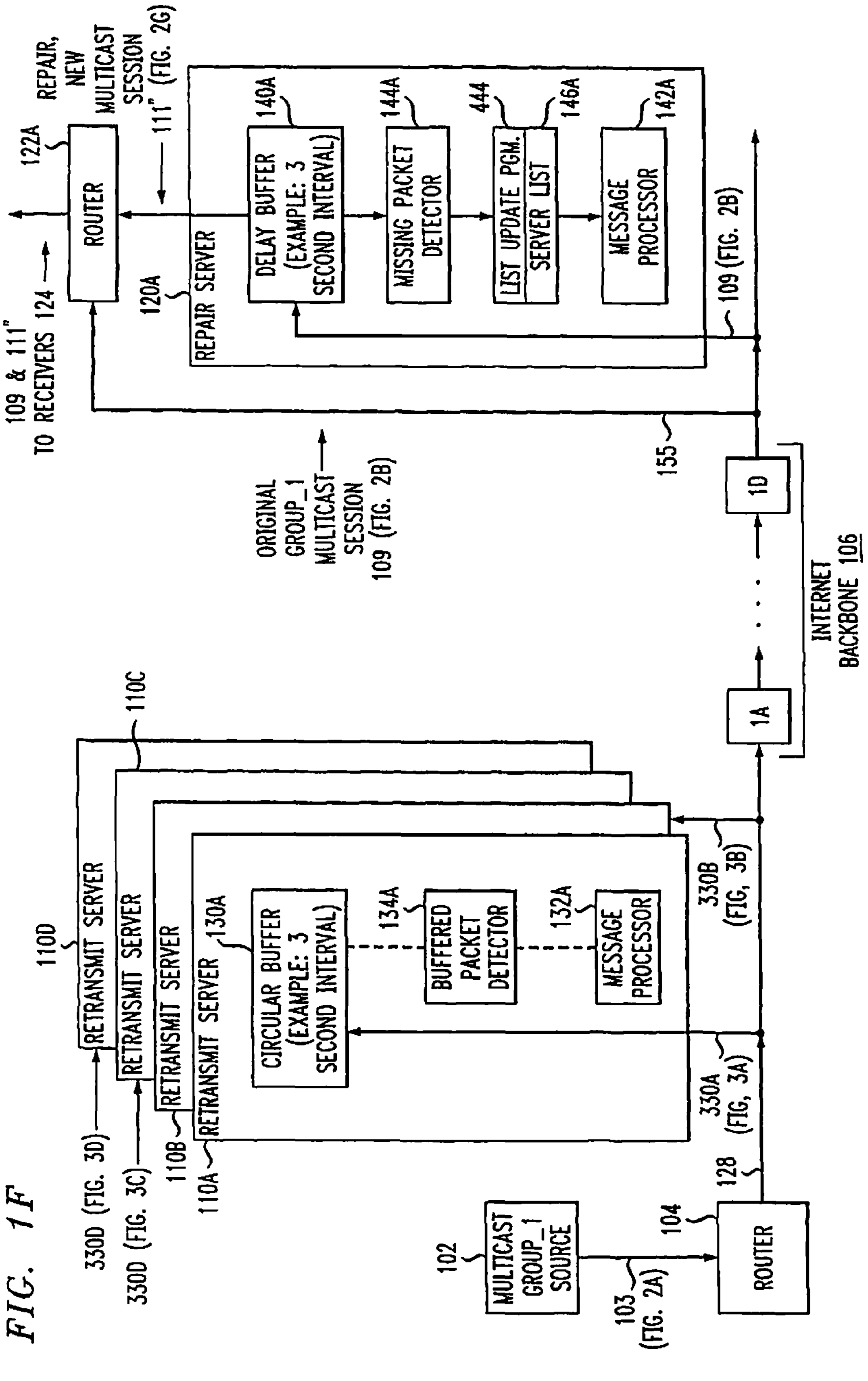
FIG. 1F is a diagram of an alternate embodiment of the network of FIG. 1, showing the direct connection 155 of the recipients' subnetwork router 122A to the Internet backbone 106, providing the recipients 124A, etc. with the choice of either the original Group_1 multicast session 109 from the source 102 or the repaired, new multicast session 111" from the repair server 120A.
Figure 2G:
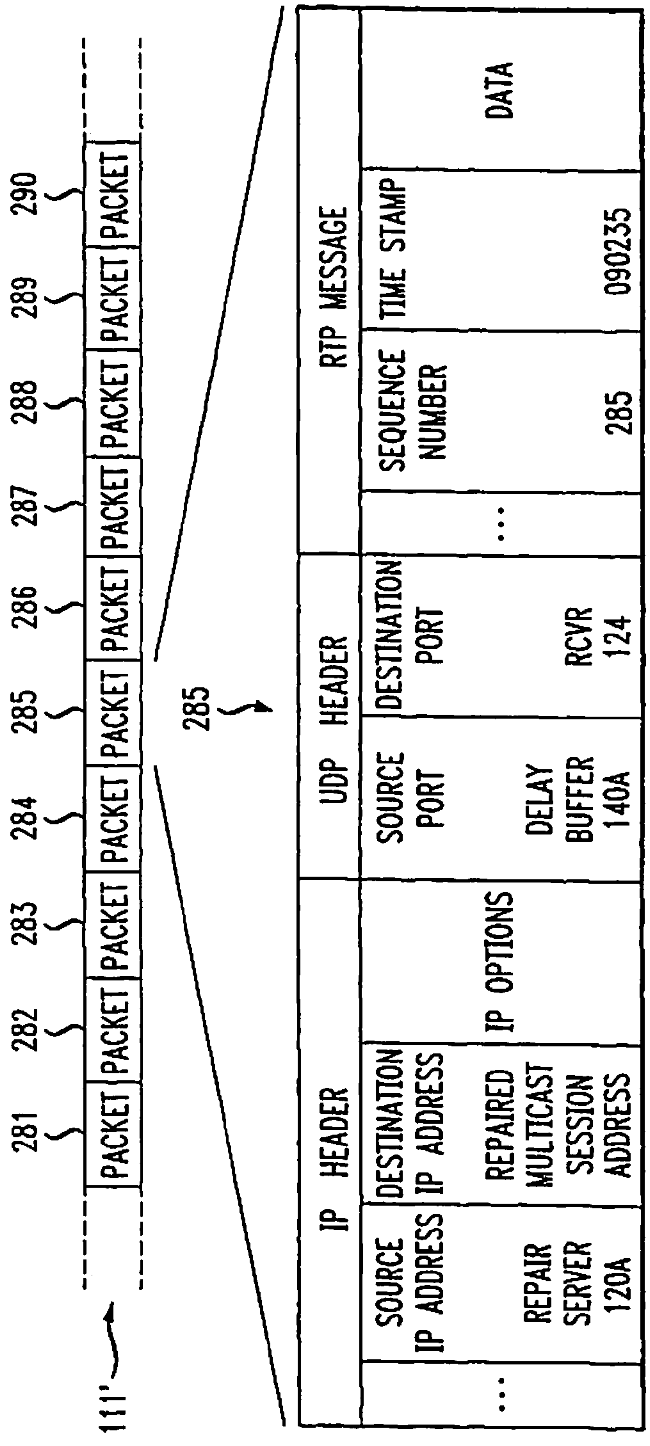
FIG. 2G illustrates in the alternative, that the repaired multicast session 111" can be a different session that is selectively chosen as a repaired multicast session by the by recipient receivers, having a different multicast IP address and port number than that for the original packet stream of FIG. 2A.

In the alternative, the multicast session 111" can be a different session that is selectively chosen as a repaired multicast session by the by recipient receivers 124A or 124A", as is shown in FIG. 2G, having a different multicast IP address and port number than that for the original packet stream 103 of FIG. 2A. FIG. 1F is a diagram of an alternate embodiment of the network of FIG. 1, showing the direct connection 155 of the recipients' subnetwork router 122A to the Internet backbone 106, providing the recipients 124A, etc. with the choice of either the original Group_1 multicast session 109 from the source 102 or the repaired, new multicast session 111" from the repair server 120A. The recipients' subnetwork router 122A can make both the unrepaired multicast session 109 from path 155 and the repaired multicast session 111" from repair server 120A available to the recipient receivers 124A and 124A". The second, repaired multicast session 111" can be selectively subscribed to by the recipients if they find that the unrepaired session 109 has insufficient quality for their purposes.

Since corrections provided by the invention are implemented by network based repair servers 120A and 120B and retransmit servers 110A-110D, the quality of a multicast transmission is improved without changing or adding to the software in either the multicast source 102 or the recipient receivers 124A, 124A', 124A", 124B, 124B', or 124B". This is a major improvement between the invention and prior proposed techniques. If the source 102 is communicating using Real-Time Transport Protocol (RTP), real video, real audio, or some other multicasting protocol before the repair is performed, the source continues to use the same protocols after the repair. Aside from the improved quality of the received signal at the recipient receiver 124A, the source 102 and recipient receivers 124A, etc. do not see any change.

Both the unrepaired multicast session 109 and a repaired multicast session 111" are available to the receiver 124A on different multicast addresses, allowing the recipient receiver 124A to selectively subscribe to the repaired multicast session 111" as a network supplied service. The repaired multicast session 111" can be encrypted by the repair server 120A, thereby limiting access to the repaired session 111" to only those recipient receivers 124A that have subscribed to the repair service, the service being provided without requiring any change to the software at the source 102.

Figure 1G:
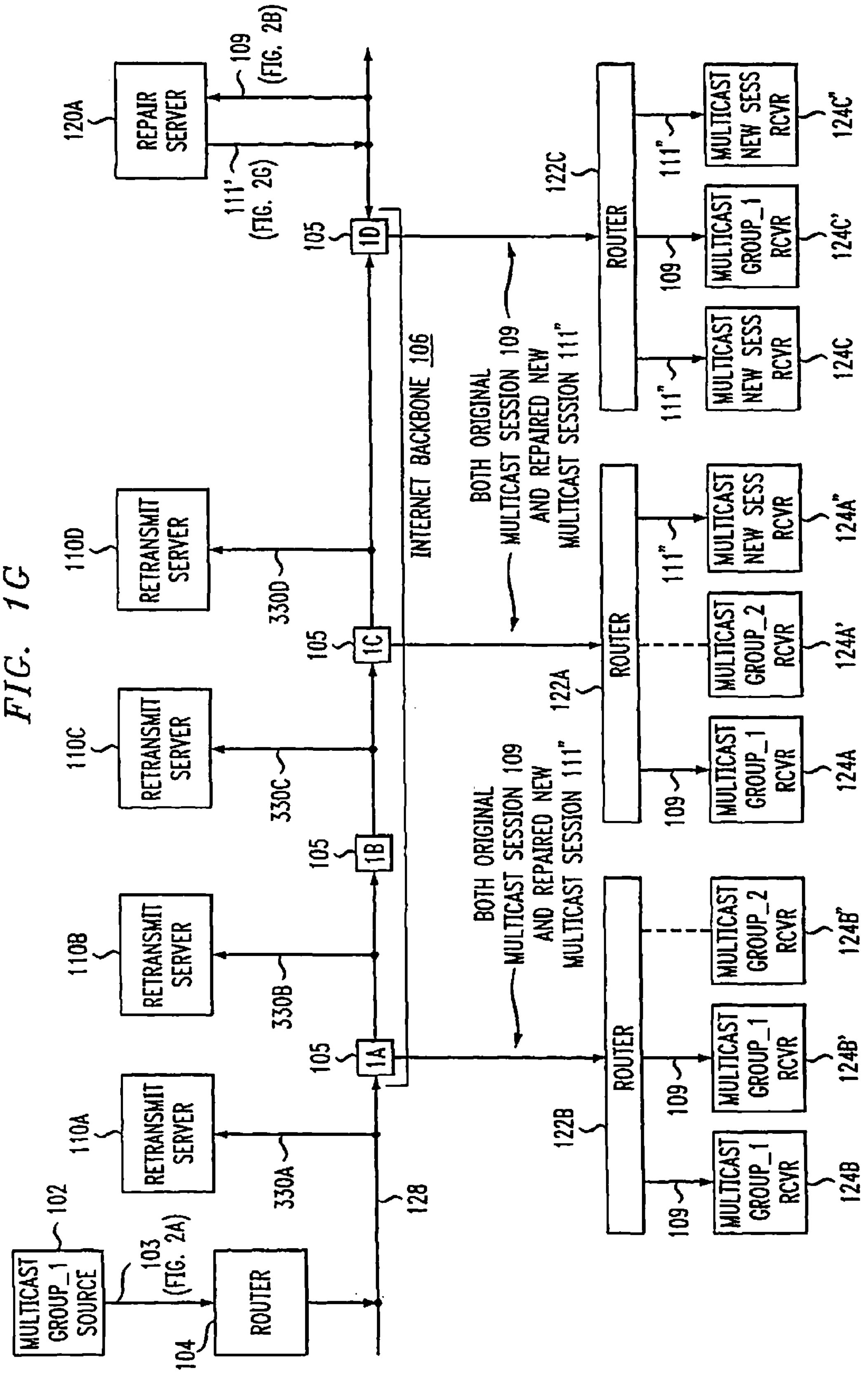
FIG. 1G is a diagram of another alternate embodiment of the network of FIG. 1, showing the distribution of the retransmit servers throughout the Internet backbone, the stub topology of the connection between the repair server and the Internet backbone, and the provision of both the original multicast session and the repaired, new multicast session to many of the recipient receivers located throughout the network. The recipients have a choice of either the original Group_1 multicast session from the source or the repaired, new multicast session from the repair server.

FIG. 1G is a diagram of another alternate embodiment of the network of FIG. 1, showing the wide distribution of the retransmit servers 110A, 110B, 110C, 110D throughout the Internet backbone 106. FIG. 1G also shows the stub topology of the connection between the repair server 120A and the Internet backbone 106. FIG. 1G also shows the provision of both the original multicast session 109 and the repaired, new multicast session 111" to many of the recipient receivers 124A, 124A', 124A", 124B, 124B', 124B", 124C, 124C', 124C" located throughout the network. The subnetwork for recipient receivers 124A, 124A', 124A" is connected through router 122A to the Internet backbone 106. The subnetwork for recipient receivers 124B, 124B', 124B" is connected through router 122B to the Internet backbone 106. The subnetwork for recipient receivers 124C, 124C', 124C" is connected through router 122C to the Internet backbone 106. The recipients 124A, 124B, 124C, etc. have a choice of either the original Group_1 multicast session 109 from the source 102 or the repaired, new multicast session 111" from the repair server 120A. Note that the original Group_1 multicast session 109 has been chosen by recipient receivers 124A, 124B, 124B', and 124C', whereas the repaired, new multicast session 111" has been chosen by recipient receivers 124A", 124C, and 124C".

FIG. 3 is a functional block diagram of a retransmit server. Memory 302 is connected by bus 304 to the CPU processor 306 that executes the instructions in programs stored in memory 302. Bus 304 also connects to hard drive storage 308, network interface card 310 which connects to the Internet backbone 106, and network interface card 312 which connects to the alternate, bypass network 600 of FIG. 6. In one embodiment, the hard drive storage 308 may be a computer-readable medium. Memory 302 has stored in it the circular buffer 130A, buffered packet detector program 134A, message processor program 132A, subscription server message processor 352, multicast session quality monitoring program 354, other retransmit server monitoring program 356, internet group management protocol 332, user datagram protocol 334, internet control message protocol 336, transmission control protocol 338, retransmit server logic program 340, operating system 342, IP protocol stack 345, multicast routing daemon 355, real-time control protocol 346, session description protocol 348, and real-time transport protocol 350.

The primary function of the retransmit servers 110A-110D is to supply any missing packets in an IP multicast session such as Group_1, to the repair servers 120A and 120B. The retransmit servers 110A-110D must buffer packets in a session received from the source 102. Each retransmit server 110A-110D must periodically transmit its IP address and port and the IP address and port of each multicast session for which it has buffered packets, to enable receivers 124A, etc. to know the availability of repair services for a particular multicast session. A multicast group with address, port number combination A, P can be reserved for the retransmit servers to communicate with the repair servers.

FIG. 4 is a functional block diagram of a repair server. Memory 402 is connected by bus 404 to the CPU processor 406 that executes the instructions in programs stored in memory 402. bus 404 also connects to hard drive storage 408, network interface card 410 which connects to the Internet backbone 106, and network interface card 412 which connects to the alternate, bypass network 600 of FIG. 6. Memory 402 has stored in it the delay buffer 140A, missing packet detector program 144A, repair module 455, controller 456, repair/encryption module 454, repair/encryption module 454', retransmit server list 146A, server list updating program 444, message processor program 142A, retransmit server monitor program 452, internet group management protocol 432, user datagram protocol 434, internet control message protocol 436, transmission control protocol 438, repair server logic program 440, operating system 442, IP multicast routing daemon 445, real-time control protocol 446, session description protocol 448, and real-time transport protocol 450. The repair servers 120A can include an optional IP Multicast Routing Daemon, as shown in FIG. 4, which communicates with multicast routing daemons on other routers to determine when the datagrams for a multicast session should be routed from one interface to another interface. The functionality of a multicast firewall can also be included. The communication from the repair server 120A to a retransmit server 110A in making a request for session repair may be multicast, instead of unicast, if the Mbone portion of the Internet backbone is not too congested.

Figure 6:
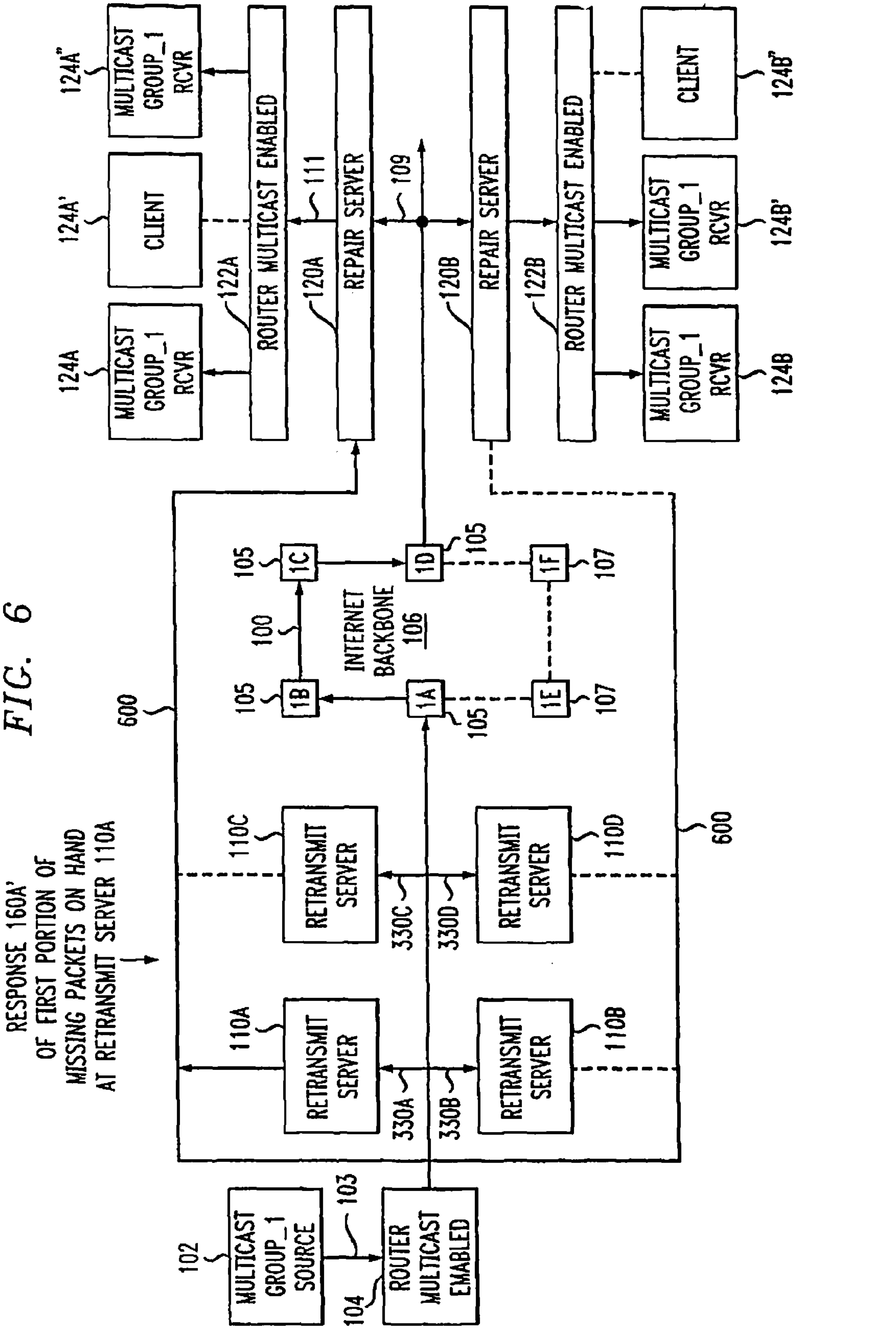
FIG. 6 is an alternate embodiment of the network of FIG. 1, showing an alternate, bypass network used for the responses from the retransmit servers to the repair server, of the portions of missing packets.

FIG. 6 is an alternate embodiment of the network of FIG. 1, showing an alternate, bypass network 600 used for the responses from the retransmit servers 110A, etc. to the repair server 120A, of the portions of missing packets. In accordance with the invention, in response to the requests, a message processor 130A in at least one of the retransmit servers 110A, retransmits in a bypass session to the repair server 120A, at least a portion the missing packets. The retransmitted packets in the bypass session are forwarded to circumvent at least some of the congested, multicast enabled routers 105 in the Internet backbone 106. This can be accomplished by transmitting the missing packets over a separate dial-up network 600 or a private virtual network 600 from the retransmit servers 110A, etc. to the repair server 120A. Another way this can be accomplished is by transmitting the missing packets in a unicast session from the retransmit servers 110A, etc. to the repair server 120A. The unicast response enables non-multicast enabled routers 107 in the Internet backbone to handle the response, thereby circumventing at least some of the congested multicast-enabled routers 105.

Figure 7:
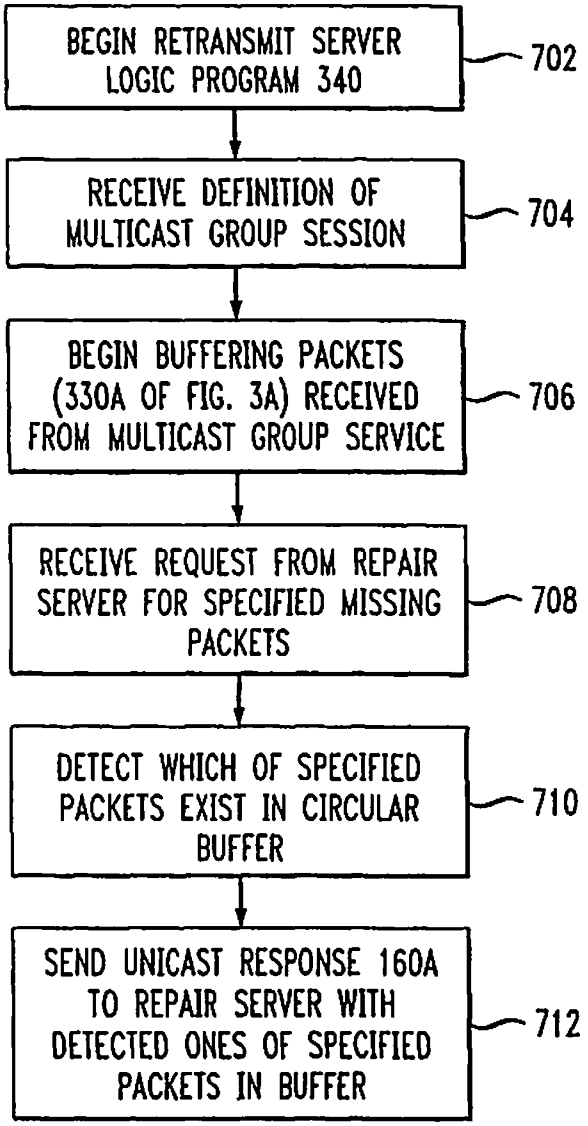
FIG. 7 is a flow diagram of the retransmit server logic program.

FIG. 7 is a flow diagram of the retransmit server logic program. Flow diagram 700 in FIG. 7 has the following steps.

Step 702: Begin retransmit server logic program 340
Step 704: Receive definition of multicast group session
Step 706: Begin buffering packets (330A of FIG. 3A) received from multicast group source
Step 708: Receive request from repair server for specified missing packet
Step 710: Detect which of specified packets exist in circular buffer
Step 712: Send unicast response 160A to repair server with detected ones of specified packets in buffer.

Figure 8A:
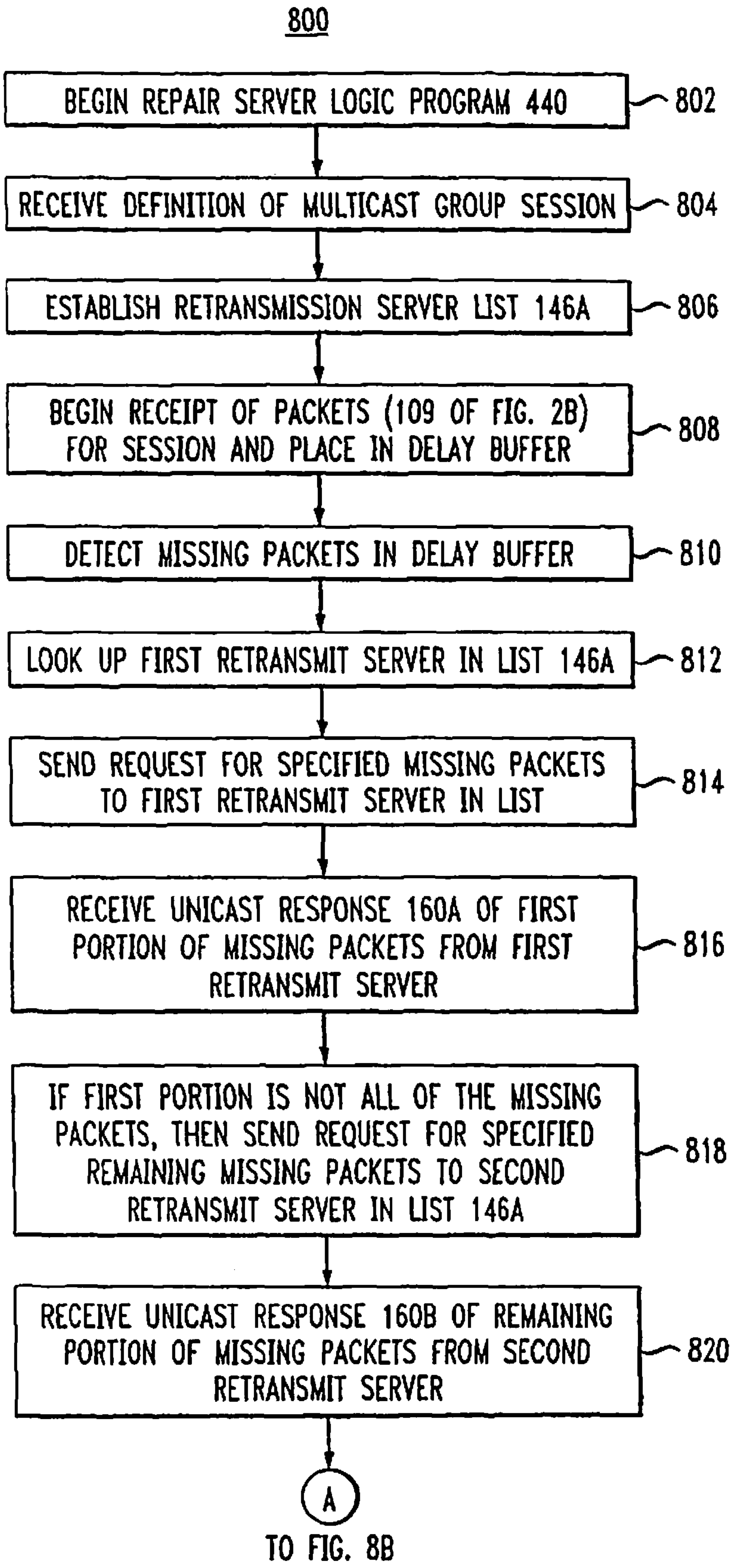
FIGS. 8A and 8B show a flow diagram of the repair server logic program.
Figure 8B:
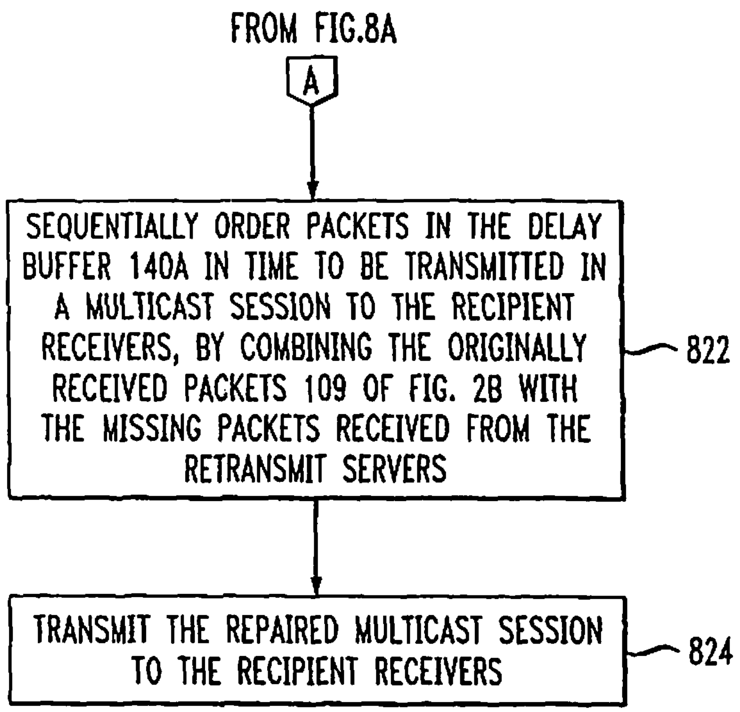

FIGS. 8A and 8B show a flow diagram of the repair server logic program. Flow diagram 800 in FIGS. 8A and 8B has the following steps.

Step 802: Begin repair server logic program 440
Step 804: Receive definition of Multicast group session
Step 806: Establish retransmission server list 146A
Step 808: Begin receipt of packets (109 of FIG. 2B) for session and place in delay buffer
Step 810: Detect missing packets in delay buffer
Step 812: Look up first retransmit server in list 146A
Step 814: Send request for specified missing packets to first retransmit server in list
Step 816: Receive unicast response 160A of first portion of missing packets from first retransmit server
Step 818: If first portion is not all of the missing packets, then send request for specified remaining missing packets to second retransmit server in list 146A.
Step 820: Receive unicast response 160B of remaining portion of missing packets from second retransmit server
Step 822: Sequentially order packets in the delay buffer 140A in time to be transmitted in a multicast session to the recipient receivers, by combining the originally received packets 109 of FIG. 2B with the missing packets received from the retransmit servers 110A-110D.
Step 824: Transmit the repaired multicast session 111' to recipient receivers 124A.

Figure 9:
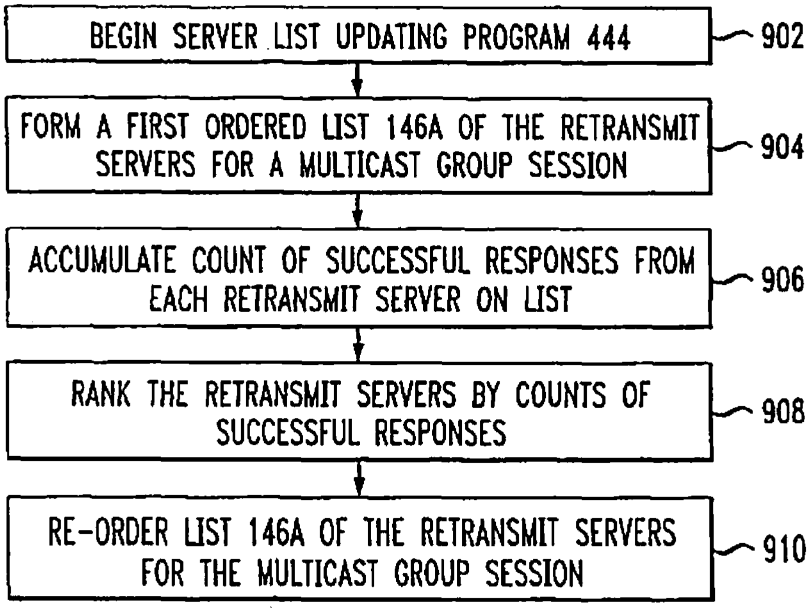
FIG. 9 is a flow diagram of the server list updating program for ranking the retransmit servers by accumulating a count of successful responses from each of them.

FIG. 9 is a flow diagram of the server list updating program 444 for ranking the retransmit servers by accumulating a count of successful responses from each of them. Flow diagram 900 in FIG. 9 has the following steps.

Figure 9A:
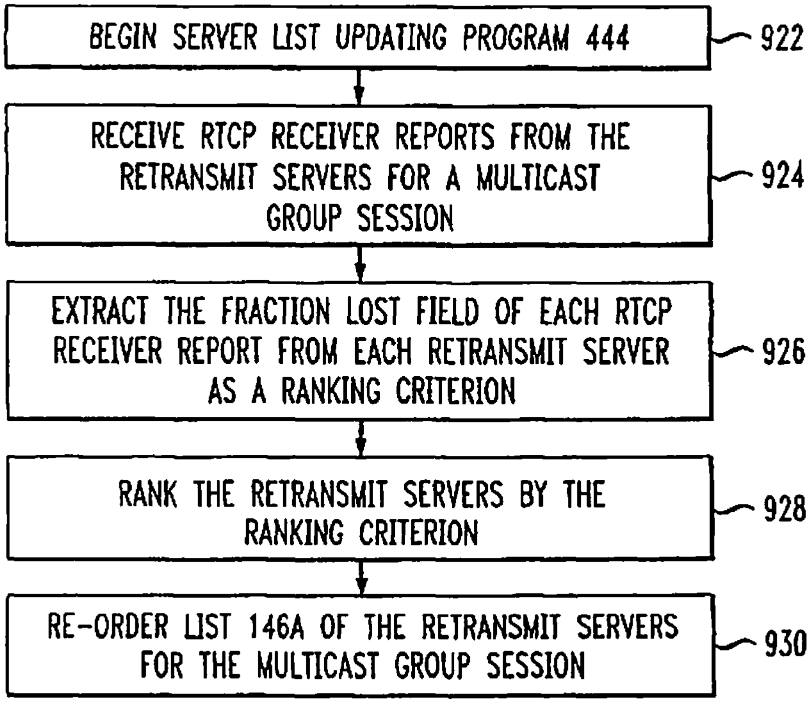
FIG. 9A is a flow diagram of the server list updating program for ranking the retransmit servers by extracting the fraction lost field of each RTCP receiver report from each retransmit server as a ranking criterion.

Step 902: Begin server list updating program 444
Step 904: Form a first ordered list 146A of the retransmit servers for a multicast group session
Step 906: Accumulate count of successful responses from each retransmit server on list
Step 908: Rank the retransmit servers by counts of successful responses
Step 910: Re-order list 146A of the retransmit servers for the multicast group session FIG. 9A is a flow diagram of the server list updating program 444 for ranking the retransmit servers by extracting the fraction lost field of each RTCP receiver report from each retransmit server as a ranking criterion. Flow diagram 900A in FIG. 9A has the following steps.

Step 922: Begin server list updating program 444
Step 924: Receive RTCP receiver reports from the retransmit servers for a multicast group session
Step 926: Extract the fraction lost field of each RTCP receiver report from each retransmit server as a ranking criterion
Step 928: Rank the retransmit servers by the ranking criterion
Step 930: Re-order list 146A of the retransmit servers for the multicast group session.

Figure 9B:
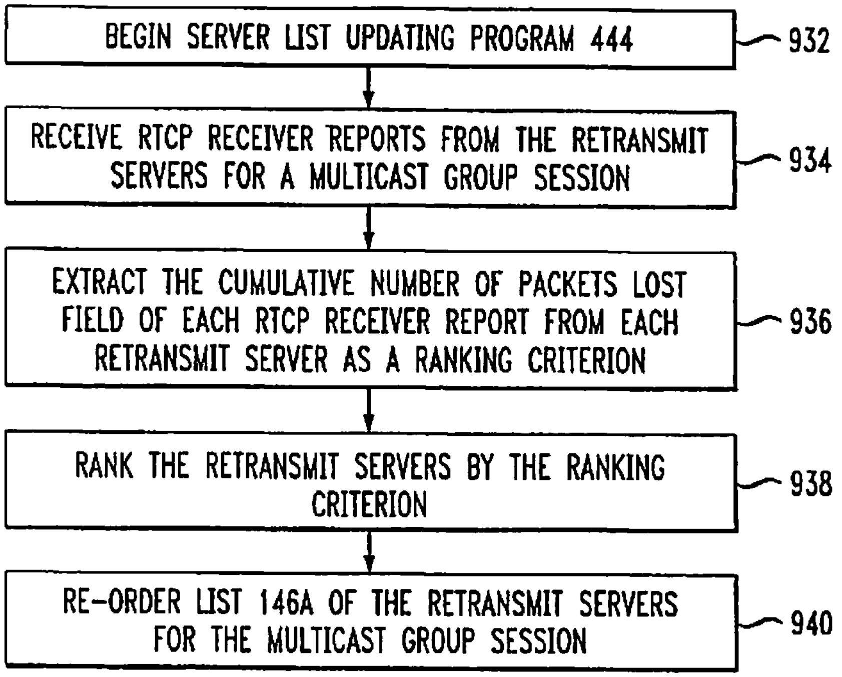
FIG. 9B is a flow diagram of the server list updating program for ranking the retransmit servers by extracting the cumulative number of packets lost field of each RTCP receiver report from each retransmit server as a ranking criterion.

FIG. 9B is a flow diagram of the server list updating program 444 for ranking the retransmit servers by extracting the cumulative number of packets lost field of each RTCP receiver report from each retransmit server as a ranking criterion. Flow diagram 900B of FIG. 9B has the following steps.

Figure 9C:
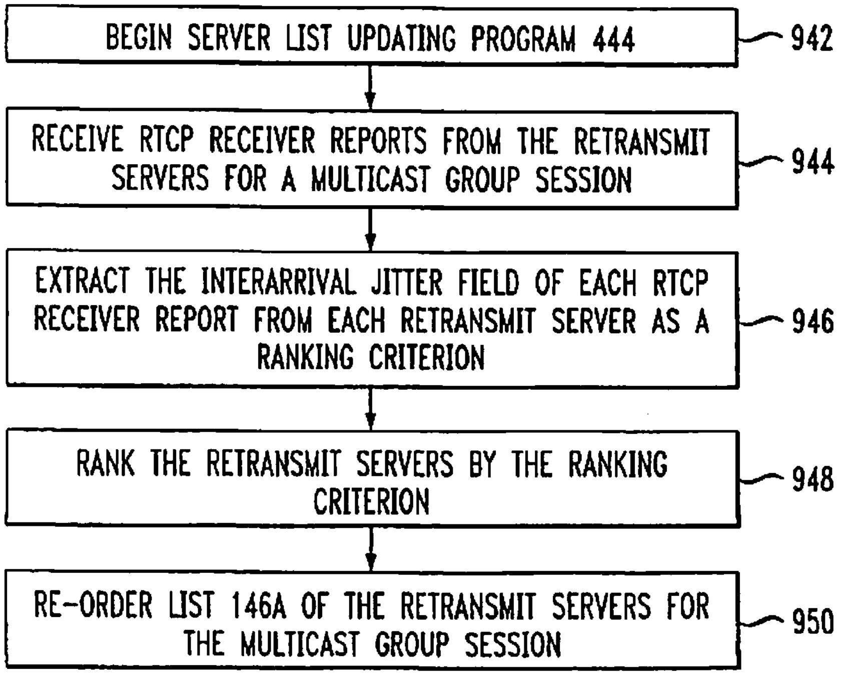
FIG. 9C is a flow diagram of the server list updating program for ranking the retransmit servers by extracting the interarrival jitter field of each RTCP receiver report from each retransmit server as a ranking criterion.

Step 932: Begin server list updating program 444
Step 934: Receive RTCP receiver reports from the retransmit server for a multicast group session
Step 936: Extract the cumulative number of packets lost field of each RTCP receiver report from each retransmit server as a ranking criterion
Step 938: Rank the retransmit servers by the ranking criterion
Step 940: Re-order list 146A of the retransmit servers for the multicast group session FIG. 9C is a flow diagram of the server list updating program 444 for ranking the retransmit servers by extracting the interarrival jitter field of each RTCP receiver report from each retransmit server as a ranking criterion. Flow diagram 900C of FIG. 9C has the following steps.

Figure 9D:
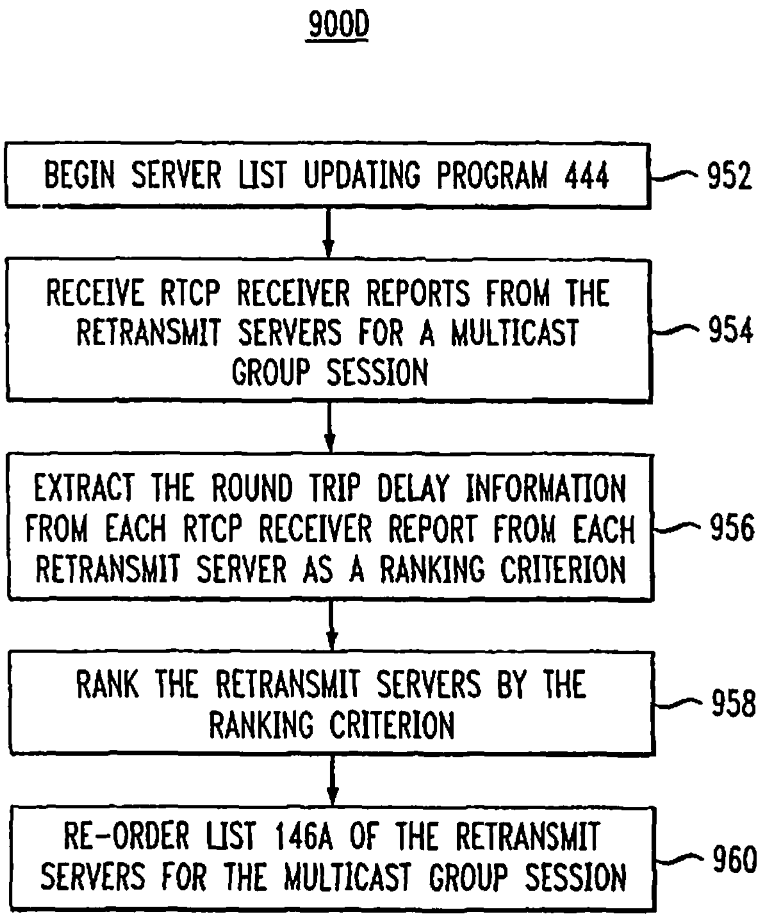
FIG. 9D is a flow diagram of the server list updating program for ranking the retransmit servers by extracting the round trip delay information from each RTCP receiver report from each retransmit server as a ranking criterion.

Step 942: Begin server list updating program 444
Step 944: Receive RTCP receiver reports from the retransmit servers for a multicast group session
Step 946: Extract the interarrival jitter field of each RTCP receiver report from each retransmit server as a ranking criterion
Step 948: Rank the retransmit servers by the ranking criterion
Step 950: Re-order list 146A of the retransmit servers for the multicast group session FIG. 9D is a flow diagram of the server list updating program 444 for ranking the retransmit servers by extracting the round trip delay information from each RTCP receiver report from each retransmit server as a ranking criterion. Flow diagram 900D of FIG. 9D has the following steps.

Figure 1H:
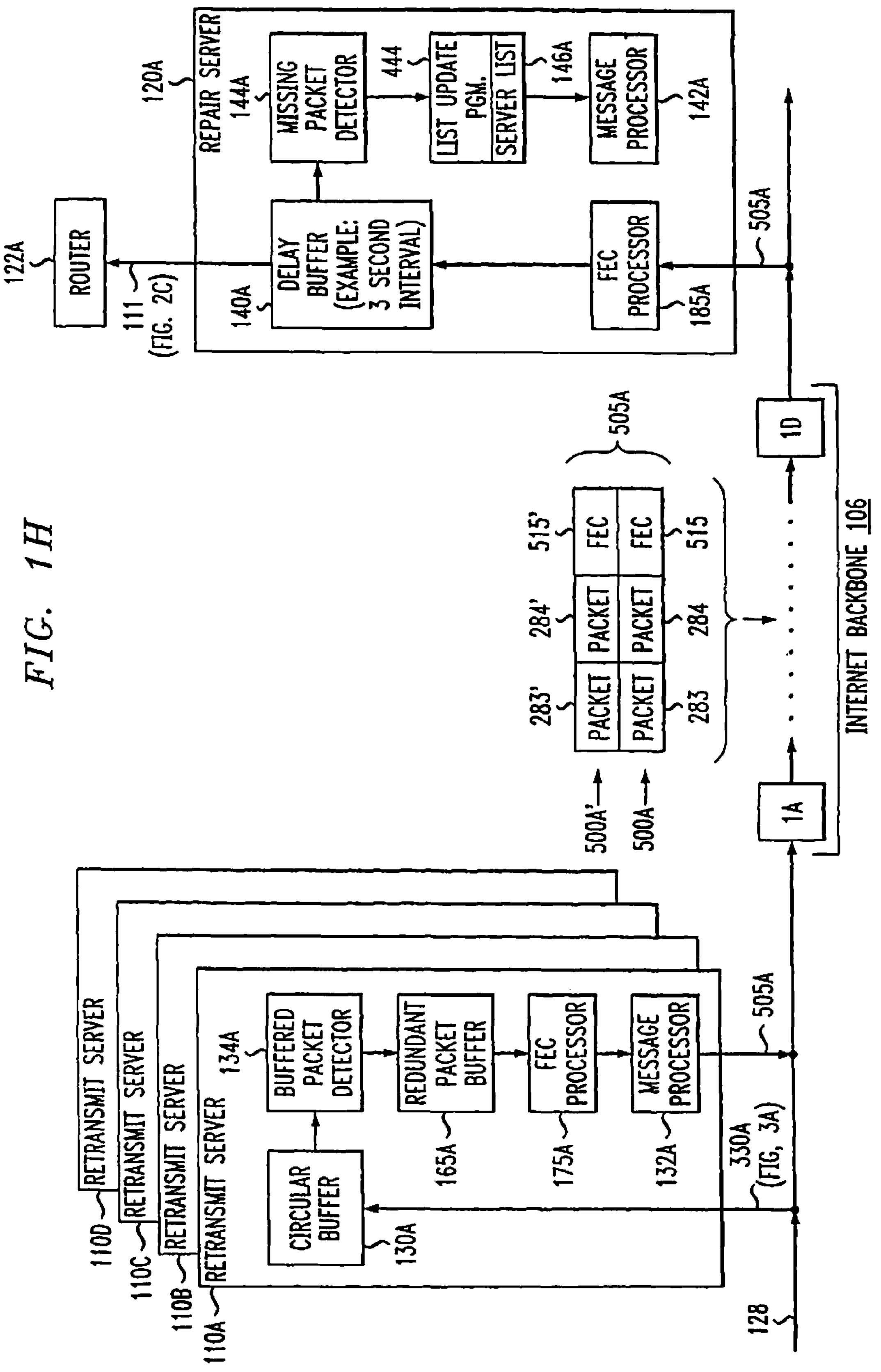
FIG. 1H shows an alternate embodiment of the invention in which the retransmit server and the repair server set up a repair dialog in response to the request from the repair server for missing packets. The retransmit server can adaptively add redundant packets and/or add a forward error correction code (FEC) to its response in proportion to the anticipated probability of loss in transmission.

Step 952: Begin server list updating program 444
Step 954: Receive RTCP receiver reports from the retransmit servers for a multicast group session
Step 956: Extract the round trip delay information from each RTCP receiver report from each retransmit server as a ranking criterion
Step 958: Rank the retransmit servers by the ranking criterion
Step 960: Re-order list 146A of the retransmit servers for the multicast group session FIG. 1H shows an alternate embodiment of the invention in which the retransmit server 110A and the repair server 120A set up a repair dialog in response to the request 150A from the repair server for missing packets. The request 150A of FIG. 4A indicates the number of missing packets at the repair server 120A. The retransmit server can anticipate the degree of loss which may occur to packets 500A in its response back to the repair server. The retransmit server 110A can adaptively add redundant packets and/or add a forward error correction code (FEC) to its response in proportion to the anticipated probability of loss in transmission. The retransmit server 110A can choose to increase the reliability of its response by (1) adding redundant packets, (2) interleaving the order of the redundant packets over time, (3) adding error detecting parity codes, and/or (4) adding forward error correcting codes that locate and correct transmission errors. Still further, the repair server and the retransmit server can begin a continuing session wherein the retransmit server continuously transmits an enhanced reliability stream of packets that are supplemented by redundant packets and/or forward error correction coding. The period of the enhanced reliability session between the retransmit server and the repair server can continue for as long as the packet loss syndrome is detected at the repair server. The enhanced reliability session can be conducted as either a unicast session or a multicast session.

FIG. 1H shows the redundant packet buffer 165A in the retransmit server 110A, in which the missing packets identified in the request 150A are duplicated. For example, the response data block 500A of FIG. 5A provides the two missing packets 283 and 284. The redundant packet buffer 165A loads those two packets and then duplicates them as packets 283' and 284', forming the redundant data block 500A'. Then the FEC processor computes an FEC value 515 data block 500A and appends it to the data block 500A. The FEC processor computes an FEC value 515' on the data block 500A' and appends it to the data block 500A'. The combination of the FEC value 515, the data block 500A, the FEC value 515' and the data block 500A' is the adaptive response 505A by the retransmit server 110A to the repair server 120A. The repair server 120A receives the response 505A and the FEC processor 185A therein reconstructs the two missing packets 283 and 284 from the combination of the FEC value 515, the data block 500A, the FEC value 515' and the data block 500A'.

The FEC processor 175A in the retransmit server operates on a data block 500A by forming a parity error detecting word corresponding to the block and adding an FEC word 515 to the block. The degree of redundancy in the FEC word can be adjusted to adapt to the magnitude of packet loss reported by the repair server in its request 150A. Then the FEC processor 175A and the message processor 132A in the retransmit server 110A can adaptively time-interleave each of the data blocks 500A and 500A' and the FEC words 515 and 515' in the blocks into time-interleaved blocks distributed over a predetermined interval. The FEC processor 175A will add an error detecting code to at least one of the time-interleaved blocks to enable a quick determination of an error condition at the repair server 120A. The message processor 132A will then transmit the time-interleaved blocks and the error detecting code as the response 505A over the Internet backbone 106 to the repair server 120A.

The FEC processor 185A at the repair server 120A then determines if there is an error present by means of the error detecting code. If not, then the packets 283 and 284 are extracted from the response 505A and sent to the delay buffer 140A. Alternately, if the FEC processor 185A determines that there is an error present by means of the error detecting code, then it determines if either the data block 500A or the redundant data block 500A' does not have an error. If one of the data blocks does not have an error, then the packets 283 and 284 are extracted from the error-free block and sent to the delay buffer 140A. Alternately, if both data blocks 500A and 500A' have errors detected in them, then the FEC processor 185A uses the FEC word for each data block to recover the error.

The repair server 120A and the retransmit server 110A can conduct a continuing session wherein the retransmit server continuously transmits an enhanced reliability stream of packets 505A that is supplemented by redundant packets, block interleaving, and/or forward error correction coding. The period of the enhanced reliability session between the retransmit server and the repair server can continue for as long as the packet loss syndrome is detected at the repair server.

Various illustrative examples of the invention have been described in detail. In addition, however, many modifications and changes can be made to these examples without departing from the nature and spirit of the invention.

What is claimed is:

1. A method comprising:

transmitting, via a retransmit server, an adaptive enhanced reliability stream of packets in a network comprising a source of a plurality of multicast packets in a multicast session and a plurality of multicast recipients in the multicast session;

selecting by a repair server, the retransmit server based upon a ranking of retransmit servers, and wherein the ranking of the retransmit servers is based upon information obtained from a field of a real-time control protocol receiver report.

2. The method of claim 1, further comprising monitoring, via the repair server, received packets transmitted to the plurality of multicast recipients.

3. The method of claim 1, further comprising requesting, in response to detecting a plurality of packets missing from the multicast session, the plurality of packets missing from the multicast session, wherein the plurality of packets missing from the multicast session are requested from the retransmit server via the repair server.

4. The method of claim 1, further comprising forming an ordered list of a plurality of retransmit servers via the repair server, wherein the ordered list stores identities of retransmit servers of the plurality of retransmit servers that are most likely to have buffered copies of the plurality of packets missing from the multicast session.

5. The method of claim 1, wherein the adaptive enhanced reliability stream of packets is supplemented by redundant packets and is transmitted to circumvent congested routers in a backbone network.

6. The method of claim 1, wherein the adaptive enhanced reliability stream of packets is supplemented by block interleaving of packets; and wherein the field is a cumulative number of packets lost field.

7. The method of claim 1, wherein the adaptive enhanced reliability stream of packets is supplemented by forward error correction coding; and wherein the field is a fraction lost field.

8. A system comprising:

a retransmit server that transmits an adaptive enhanced reliability stream of packets in a network comprising a source of a plurality of multicast packets in a multicast session and a plurality of multicast recipients in the multicast session, wherein the retransmit server is selected by a repair server based upon a ranking of retransmit servers, wherein the ranking of retransmit servers is based upon information obtained from a field of a real-time control protocol receiver report.

9. The system of claim 8, further comprising monitoring, via the repair server, received packets of the plurality of multicast packets transmitted by the source and detecting a plurality of packets missing from the multicast session.

10. The system of claim 8, further comprising requesting, in response to detecting a plurality of packets missing from the multicast session, the plurality of packets missing from the multicast session, wherein the plurality of missing packets from the multicast session are requested from the retransmit server by the repair server.

11. The system of claim 8, further comprising forming, via the repair server, an ordered list of a plurality of retransmit servers, wherein the ordered list stores identities of retransmit servers of the plurality of retransmit servers that are most likely to have buffered copies of the plurality of packets missing from the multicast session.

12. The system of claim 8, further comprising requesting, from the retransmit server, a plurality of packets missing from the multicast session, wherein the plurality of packets missing from the multicast session are requested by the repair server.

13. The system of claim 8, wherein the adaptive enhanced reliability stream of packets is supplemented by redundant packets and is transmitted to circumvent congested routers in a backbone network.

14. The system of claim 8, wherein the adaptive enhanced reliability stream of packets is supplemented by block interleaving of packets; and the field is a cumulative number of packets lost field.

15. The system of claim 8, wherein the adaptive enhanced reliability stream of packets is supplemented by redundant packets; and the field is an interarrival jitter field.

16. The system of claim 8, wherein the adaptive enhanced reliability stream of packets is supplemented by forward error correction coding; and the field is a fraction lost field.

17. The system of claim 8, wherein the adaptive enhanced reliability stream of packets comprises redundant packets.

18. The system of claim 8, wherein the adaptive enhanced reliability stream of packets comprises block interleaved packets.

19. The system of claim 8, wherein the adaptive enhanced reliability stream of packets comprises forward error correction coding.

20. A non-transitory computer-readable medium storing instructions, which when loaded and executed by a processor, cause the processor to perform operations comprising:

transmitting, via a retransmit server, an adaptive enhanced reliability stream of packets in a network comprising a source of a plurality of multicast packets in a multicast session and a plurality of multicast.

* * * * *